United States Patent
Szalavari et al.

(10) Patent No.: US 10,817,743 B2
(45) Date of Patent: Oct. 27, 2020

(54) USER-DESIGNED MACHINE-READABLE TARGET CODES

(71) Applicant: PTC Inc., Needham, MA (US)

(72) Inventors: Zsolt Szalavari, Vienna (AT); Michael Gervautz, Vienna (AT); John James Lechleiter, Carlsbad, CA (US)

( * ) Notice: Subject to any disclaimer, the term of this patent is extended or adjusted under 35 U.S.C. 154(b) by 151 days.

(21) Appl. No.: 16/049,752

(22) Filed: Jul. 30, 2018

(65) Prior Publication Data
US 2018/0341831 A1    Nov. 29, 2018

Related U.S. Application Data

(63) Continuation of application No. PCT/US2017/015525, filed on Jan. 28, 2017.
(Continued)

(51) Int. Cl.
*G06K 9/46* (2006.01)
*G06K 9/00* (2006.01)
(Continued)

(52) U.S. Cl.
CPC ....... *G06K 9/4609* (2013.01); *G06K 7/10722* (2013.01); *G06K 7/1434* (2013.01);
(Continued)

(58) Field of Classification Search
CPC ...... G06K 9/4609; G06K 7/1434; G06K 9/18; G06K 19/06037; G06K 7/10722;
(Continued)

(56) References Cited

U.S. PATENT DOCUMENTS

| 6,691,922 B2 | 2/2004 | Brooks et al. |
| 7,185,816 B1 | 3/2007 | Shoobridge |

(Continued)

FOREIGN PATENT DOCUMENTS

| EP | 2806377 A2 | 11/2014 |
| WO | 2012/022678 A1 | 2/2012 |

(Continued)

OTHER PUBLICATIONS

"App-tivated Products and Integrated Play with Zapcodes", retrived from URL:https://www.zappar.com/blog/app-tivated-products-and-integrated-play-with-zapcodes/, dated Aug. 19, 2014, 4 pages.
(Continued)

*Primary Examiner* — Yon J Couso
(74) *Attorney, Agent, or Firm* — Patent GC LLC; Alexander Franco

(57) ABSTRACT

In a template design application, a user creates a template for a machine-readable image target that supports encoded data and augmented reality homography. The design application enforces design constraints that ensure reliable detection of the target by a detection application while supporting creative freedom in designing the template. The design constraints can include specification of a detection contour outlining a transition between a perimeter of a border shape and an adjacent area of a contrasting color. Data to be encoded is applied to the template to create printable image instances of the target. The template is also loaded into a detection application, which scans and recognizes printed instances of the target and decodes the encoded data. The detection application uses the decoded data to create a synthesized image target matching the scanned target and which is used to execute further tracking of the target within a moving field of view.

21 Claims, 19 Drawing Sheets

Related U.S. Application Data

(60) Provisional application No. 62/288,022, filed on Jan. 28, 2016.

(51) Int. Cl.
| | |
|---|---|
| *G06K 7/10* | (2006.01) |
| *G06K 19/06* | (2006.01) |
| *G06K 9/18* | (2006.01) |
| *G06K 7/14* | (2006.01) |
| *G06T 19/00* | (2011.01) |

(52) U.S. Cl.
CPC ........... *G06K 9/00671* (2013.01); *G06K 9/18* (2013.01); *G06K 19/06037* (2013.01); *G06T 19/006* (2013.01); *G06K 2209/25* (2013.01); *G06T 2207/10016* (2013.01); *G06T 2207/30204* (2013.01)

(58) Field of Classification Search
CPC ........... G06K 9/00671; G06K 2209/25; G06T 19/006; G06T 2207/30204; G06T 2207/10016
See application file for complete search history.

(56) References Cited

U.S. PATENT DOCUMENTS

| | | |
|---|---|---|
| 8,814,048 B2 | 8/2014 | Taylor |
| 9,111,164 B1* | 8/2015 | Anderton ............. G06K 7/1413 |
| 9,697,447 B2* | 7/2017 | Schory ............. G06K 19/06037 |
| 2011/0011926 A1 | 1/2011 | Matsumoto |
| 2013/0026241 A1* | 1/2013 | Sakahashi ........ G06K 19/06037 235/494 |
| 2013/0112751 A1* | 5/2013 | Maurer ............ G06K 19/06046 235/454 |
| 2014/0340423 A1 | 11/2014 | Taylor et al. |
| 2017/0024840 A1* | 1/2017 | Holub ................... G06T 1/0028 |
| 2018/0018547 A1* | 1/2018 | Alon ................ G06K 19/06037 |

FOREIGN PATENT DOCUMENTS

| | | |
|---|---|---|
| WO | 2015/157517 A1 | 10/2015 |
| WO | 2017/132634 A1 | 8/2017 |

OTHER PUBLICATIONS

"Barcode Studio Barcode Designer", Version 15.4, TEC-IT Datenverarbeitung GmbH, dated Sep. 7, 2016, 83 Pages.

"ZebraDesignerTM ProTM" User Guide, Zebra Technologies, dated Nov. 29, 2011, 170 pages.

Constine, Josh, "How Scapchat Made QR Codes Cool Again", retrived from URL:https://techcrunch.com/2015/05/04/snapcode/. 3 pages.

International Search Report and Written Opinion Received for PCT Application No. PCT/US2017/015525, dated Jun. 20, 2017, 16 pages.

Tian Hao et al., "COBRA: Color Barcode Streaming for Smartphone Systems", Proceedings of the 10th International Conference on Mobile Systems, Applications, and Services, Mobisys '12, Jan. 1, 2012, p. 85.

* cited by examiner

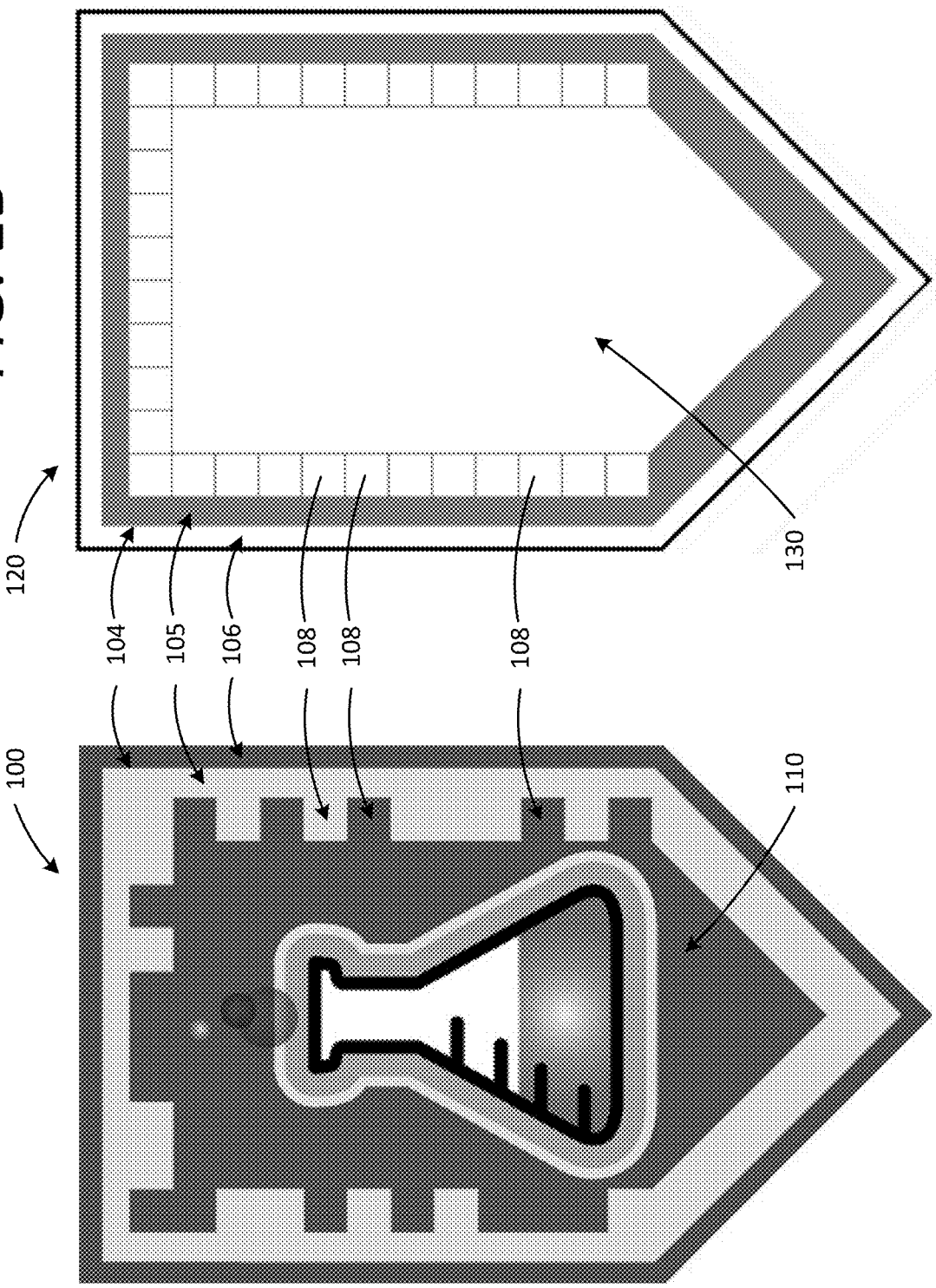

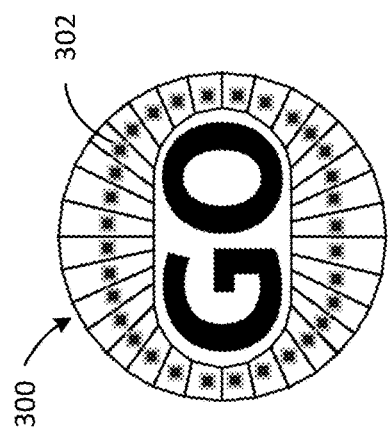
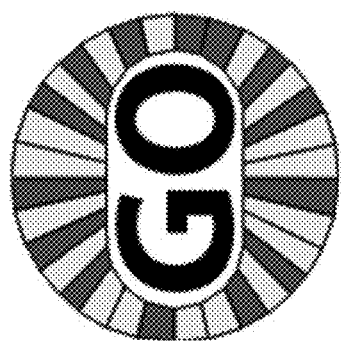
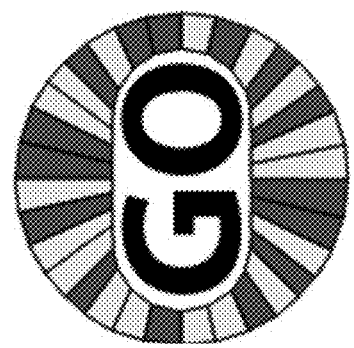
FIG. 3A
FIG. 3B
FIG. 3C
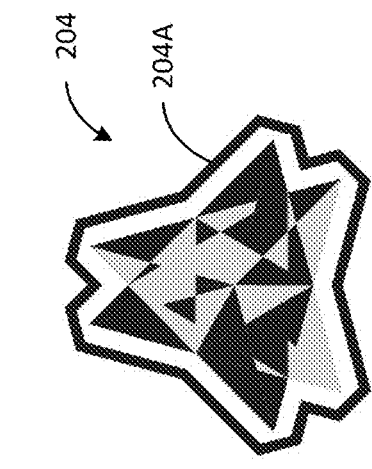
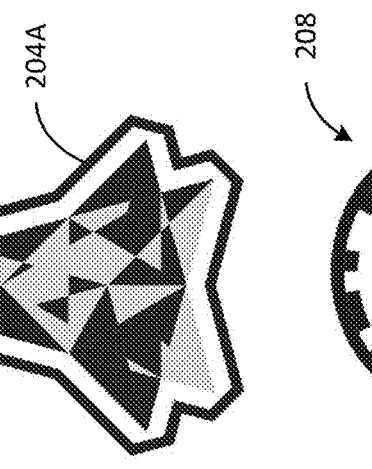
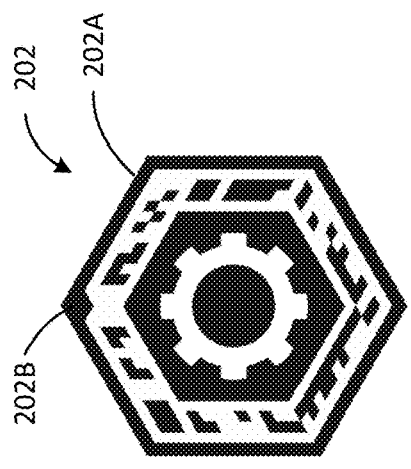
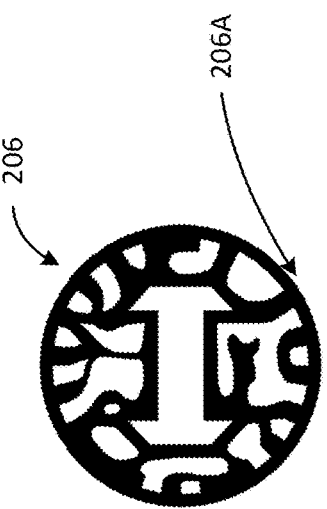
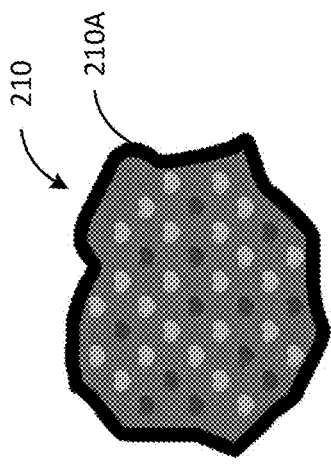
FIG. 2

FIG. 10
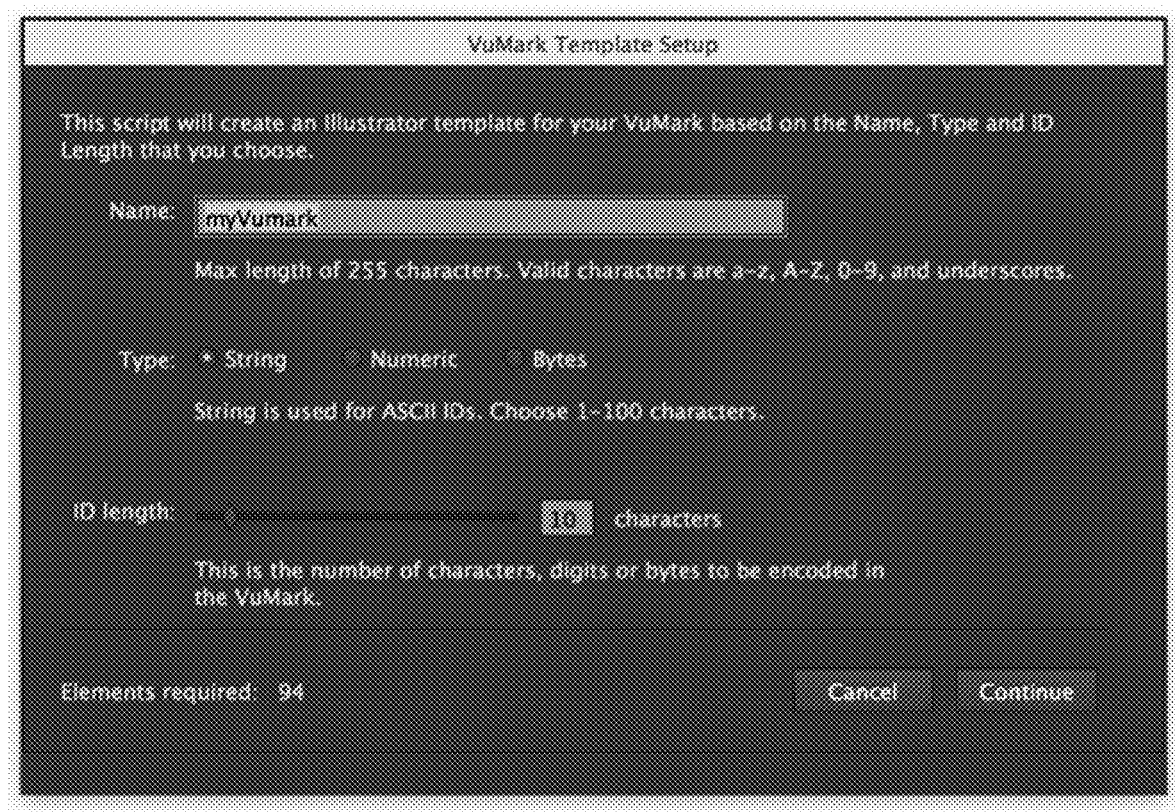
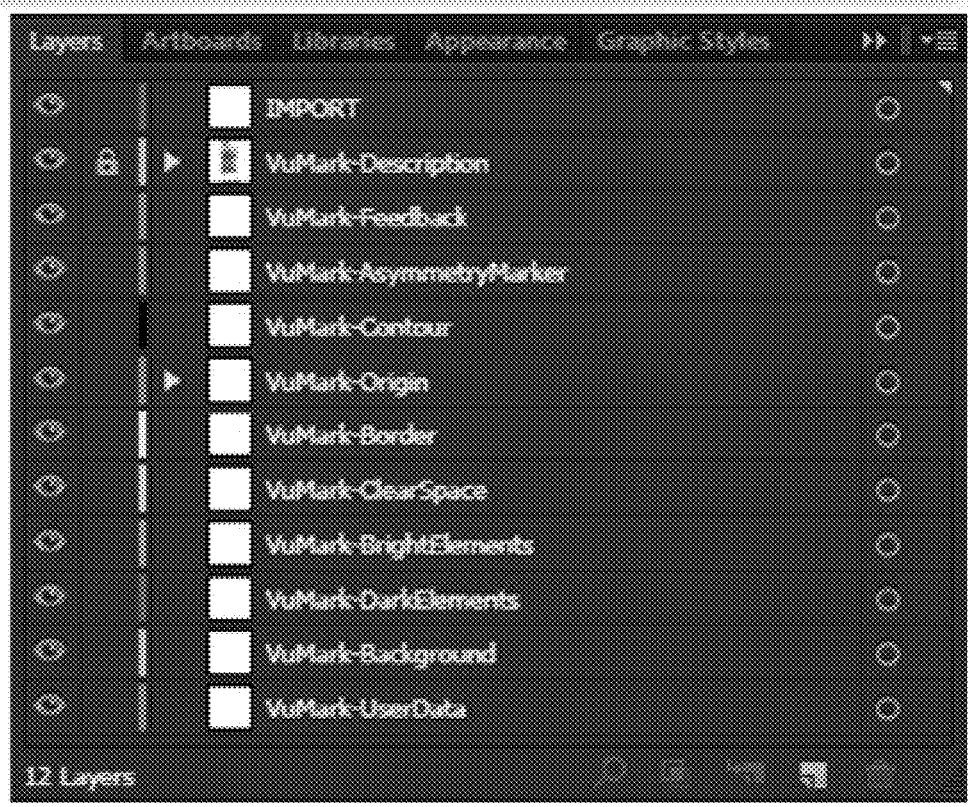
FIG. 12

FIG. 13

VuMark Properties

VuMark: myVumark
IDtype: string
IDlength: 10
Elements required: 94

Design Guideline Verification

Number of Elements     FAIL
0 Light and 0 Dark Elements found.
There must be exactly 94 Light and Dark Elements.

Element sizes and locations     FAIL
The required minimum size of Elements is 3 percent of your VuMark's largest dimension. The smallest computed Element size in your design is 0 percent. Increase the size of your Elements with respect to the overall VuMark size.

Individual Light and Dark Elements do not overlap. Make sure that Elements overlap exactly.

Element contrast     FAIL
Required greyscale contrast is 40 percent and your design provides 0 percent.
Increase the greyscale contrast of your Elements.

Contour     FAIL
Your contour has only 0 segments.
Minimum is 4 segments.

At least one segment is too small at 0 percent of your VuMark's overall width. Increase the segment size to at least 3 percent.

At least one segments in your Contour is not linear. Use only linear segments.

Border and Clear Space contrast     FAIL
The required greyscale contrast difference between Border and Clear Space is 40 percent. Contrast in your design is 0 percent. Increase the greyscale contrast between the Border and the Clear Space.

Border and Clear Space width     VERIFY
Verify that the magenta width indicator does not reach over your Border and Clear Space on both sides of the Contour.

VuMark Template NOT ready for export.

Add VuMark Target

FIG. 15

File:

[ Choose File                                              ] [ Browse... ]

.svg(max file size 2mb).

Width:

[                                                                        ]

Enter the width of your target in the same unit as your augmentation. The size of the target shall be relative to the size of the augmented virtual content. The target height will be calculated automatically when you upload your image.

Name:

[                                                                        ]

Name must be unique to a database. When a target is detected in your application, this will be reported in the API.

[ Cancel ] [ Add ]

Generate VuMark

Name: ACME
ID Type: String
ID Length: 9

This is what will be encoded in the VuMark and must match the Type and Length defined above.

Graphic Format

[ SVG                    ⌄ ]
[ SVG ]
[ PDF ]
[ PNG ]

[ Cancel ] [ Download ]

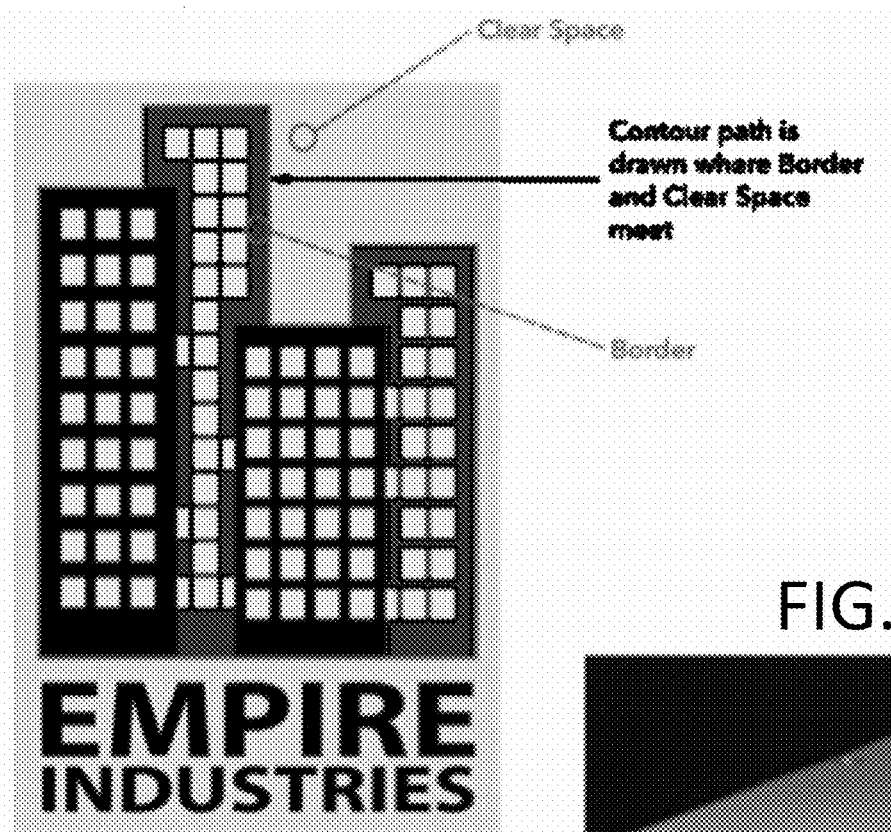
FIG. 17
FIG. 19

FIG. 18

FAIL
- Some of the magenta circles touch or overlap with each other.
- The size of some of the Elements are smaller than the size of the magenta circles. Notice how some of the yellow "windows" in the design do not completely fill the area indicated by circles.
- Some of the magenta circles overlap the Border area.

PASS
- All Elements are at least the same or larger size/area as the magenta circles.
- None of the magenta circles touch each other.
- The magenta circles don't overlap the Border area.

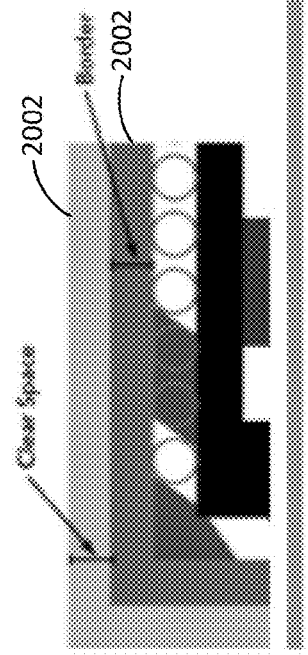
FAIL      FIG. 20A
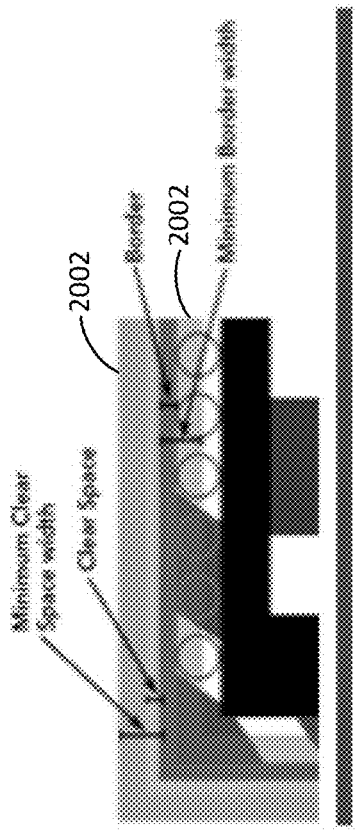
PASS      FIG. 20B
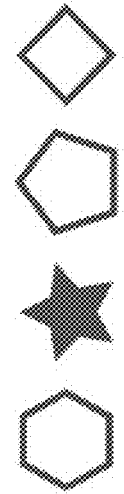
Non-rotationally symmetric contours
FIG. 21A
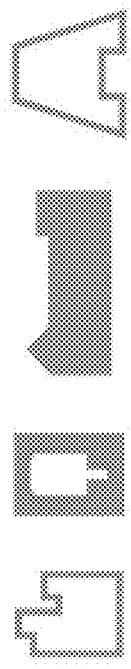
Rotationally symmetric contours (orders 6, 5, 5, 4)
FIG. 21B
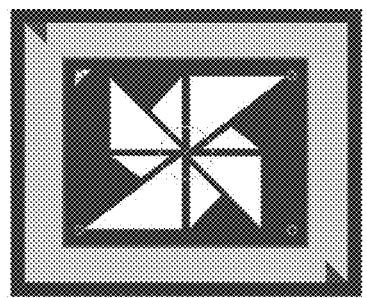
FIG. 22C
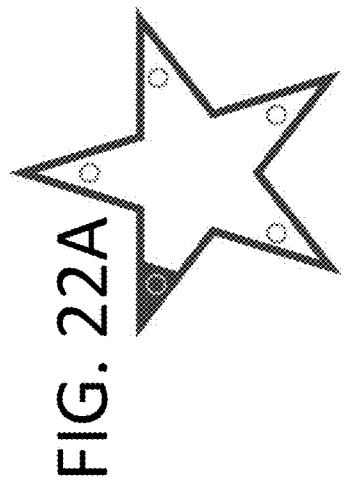
FIG. 22B
FIG. 22A

FIG. 23
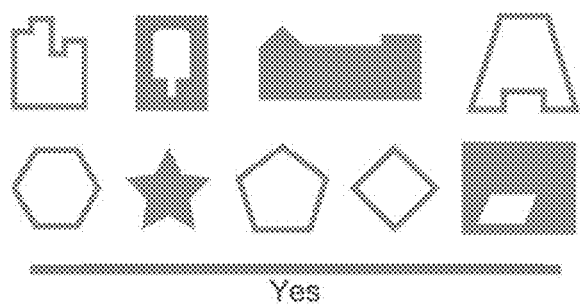
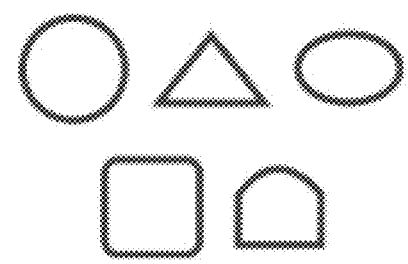
FIG. 25
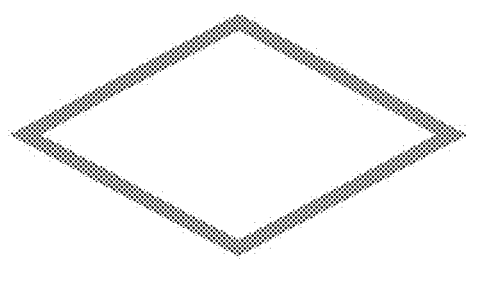
FIG. 24
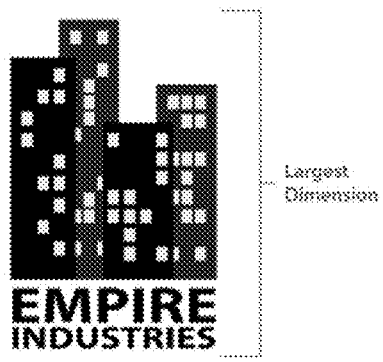
FIG. 27
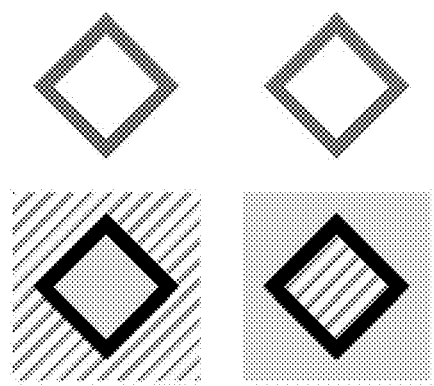
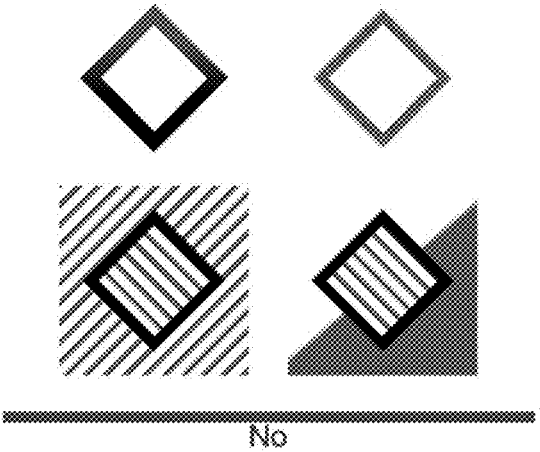
FIG. 26
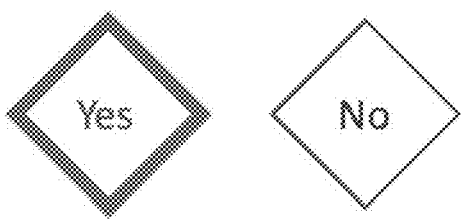

USER-DESIGNED MACHINE-READABLE TARGET CODES

RELATED APPLICATIONS

The subject matter of this application is related to PCT application PCT/US17/15525, filed 2017 Jan. 29 and U.S. Provisional Application No. 62/288,022, filed on 2018 Jan. 28, all of which applications are incorporated herein by reference.

BACKGROUND OF THE INVENTION

Existing technologies, such as barcodes and QR codes, support the encoding of information into and the reading of information from machine-readable codes. Certain machine-readable codes or targets, such as Frame Markers or ImageTargets, supported by the Vuforia™ mobile vision platform, also provide the capability to determine position and orientation of an object within a field of view of a camera. The position and orientation, in turn, can be used by augmented reality (AR) applications need to deliver unique experiences on a wide range of objects, such as machinery and manufactured products. These existing codes, however, are limited to standard formats that may not be aesthetically pleasing or appropriate for placement on visually prominent portions of a product or object.

SUMMARY OF THE INVENTION

A user-designed, machine-readable code, also referred to herein as a target, is printed or otherwise disposed on an object in order to support one or both of machine-reading of encoded data from the code and machine-determination of the position and orientation of the object. The user-designed, machine-readable code can deliver a unique augmented reality experience on any object and/or enable the machine-reading of encoded data while allowing design freedom for a custom look and feel of the code itself. The form and visual representation of the user-designed code can be highly flexible, with the ability to support visually appealing graphics, logos and designs. The user-designed code overcomes the limitations of existing bar code solutions that do not support augmented reality experiences and can detract from a product's appearance. The user-designed code supports encoding varying amounts and kinds of data such as URLs or a product serial numbers. The user-designed code can be designed to distinguish any number of objects or products, since the range of the encoded data can be a user-determined design parameter. A single template for a user-designed code can be used to encode multiple instances of the code where each instance encodes different data. The user-designed code can be detected and tracked, for example, with a mobile device with a camera. Position and orientation within a camera image can be determined automatically, so the user-designed code can be used for tracking an object, such as within an augmented reality application.

In a template design application, a user creates a template for a machine-readable image target that supports encoded data and augmented reality homography. The design application enforces design constraints that ensure reliable detection of the target by a detection application while supporting creative freedom in designing the template. The design constraints can include, for example, specification of a detection contour outlining a transition between a perimeter of a border shape and an adjacent area of a contrasting color. The design constraints can also include, for example, specification of a plurality of code elements used to encode data based on color, wherein each specification includes a defined shape. Data to be encoded is applied to the template to create printable image instances of the target. The template is also loaded into a detection application, which scans and recognizes printed instances of the target and decodes the encoded data. The detection application uses the decoded data to create a synthesized image target matching the scanned target and which is used to execute further tracking of the target within a moving field of view.

In one aspect, a system includes a non-transitory computer readable medium encoded with instructions that cause a computer to execute a template design application configured to receive user input specifying a design for a machine-readable target. The user input can include a specification of a detection contour comprising at least a predetermined minimum number of segments and configured to be recognized by a detection application, and a specification of each of a plurality of graphical elements used to encode data based on color, wherein each specification includes a shape. The template design application can be configured to output a target template data file including a definition of the detection contour, and a definition of the plurality of graphical elements. The system also includes a non-transitory computer readable medium encoded with instructions that cause a computer to execute a target manager application configured to output a target instance image file based on the target template data file and based on data to be encoded. The system also includes a non-transitory computer readable medium encoded with instructions that cause a computer to execute a detection application. The detection application can be configured to: receive a captured image of a printed target instance produced from the target instance image file, apply detection data to the captured image, wherein the detection data is based on the target template data file, match a detection contour defined in the detection data to the captured image, sample each of the plurality of graphical elements from the captured image, and decode the data based on the sampled plurality of graphical elements.

In one aspect, the detection application can be further configured to: synthesize a tracking target based on the decoded data and the detection data, receive additional captured images in which the target instance moves from an initial location within a field of view, use the synthesized tracking target to perform tracking of the target instance moving within the field of view, determine a homography of the target instance moving within the field of view, and augment the additional captured images based on the determined homography.

In one aspect, the detection application can be further configured to determine a homography based on the captured image and the detection data.

In one aspect, the detection application can be further configured to provide the homography and the decoded data to an augmented reality application.

In one aspect, the target manager application can be further configured to output the detection data for detecting instances of the machine-readable target.

In one aspect, the detection contour can be a closed path and at least one of the plurality of graphical elements can be located outside of the detection contour.

In one aspect, each segment can be selected from the group consisting of: a line, an arc and a curve.

In one aspect, the detection application can be further configured to perform an error correction on the decoded data, determine whether the decoded data is valid based on an algorithmic specification of valid bit codes, and discard decoded data that has been determined to be invalid.

In one aspect, the user input can further include a specification of a placeholder area, the target template data file can include a definition of the placeholder area, and the target manager application can be further configured to insert any of one or more instances of different non-functional designs in the placeholder area to create a target instance image file.

In one aspect, the user input can further include a specification of a border shape having a boundary matching the detection contour. The design application can be further configured to provide an indication to a user of whether: the contour is a not closed path, the contour does not include at least the predetermined minimum number of segments, any of the segments are less than a predetermined minimum relative size, the border shape does not maintain at least a predetermined minimum relative width in relation to the contour, and any of the element shapes are less than a predetermined minimum relative size.

In one aspect, the design application can be further configured to determine whether: the contour is a not closed path, the contour does not include at least the predetermined minimum number of segments, any of the segments are less than a predetermined minimum relative size, and any of the element shapes are less than a predetermined minimum relative size.

In one aspect, the design application can be further configured to determine whether the border shape does not maintain at least a predetermined minimum relative width in relation to the contour.

In one aspect, the user input can further include: a specification of a color for the border shape, a specification of a color for a clear space area that abuts the border shape along the detection contour, and a specification of two colors for each of the plurality of graphical elements. The design application can be further configured to determine whether: there is at least a predetermined minimum amount of color contrast between the border shape and the clear space area, and there is at least a predetermined minimum amount of color contrast between the two colors specified for each of the plurality of graphical elements.

In one aspect, the user input can further include a specification of a shape of the clear space area. The design application can be further configured to provide an indication to a user of whether: the shape of the clear space area does not maintain at least a predetermined minimum relative width in relation to the contour on an opposite side from the border shape.

In one aspect, the design application can be further configured to determine whether: the shape of the clear space area does not maintain at least a predetermined minimum relative width in relation to the contour on an opposite side from the border shape.

In one aspect, a system includes one or more computers. The one or more computers can execute a template design application configured to receive user input specifying a design for a machine-readable target. The user input can include a specification of a detection contour including at least a predetermined minimum number of segments and configured to be recognized by a detection application, and a specification of each of a plurality of graphical elements used to encode data based on color, wherein each specification includes a shape. The template design application can be configured to output a target template data file including a definition of the detection contour, and a definition of the plurality of graphical elements. The one or more computers can execute a target manager application configured to output a target instance image file based on the target template data file and based on data to be encoded. The one or more computers can execute a detection application. The detection application can be configured to: receive a captured image of a printed target instance produced from the target instance image file, apply detection data to the captured image, wherein the detection data is based on the target template data file, match a detection contour defined in the detection data to the captured image, sample each of the plurality of graphical elements from the captured image, and decode the data based on the sampled plurality of graphical elements.

In one aspect, a computer-implemented method includes, executing a template design application configured to receive user input specifying a design for a machine-readable target. The user input can include a specification of a detection contour comprising at least a predetermined minimum number of segments and configured to be recognized by a detection application, and a specification of each of a plurality of graphical elements used to encode data based on color, wherein each specification includes a shape. The template design application can be configured to output a target template data file including: a definition of the detection contour, and a definition of the plurality of graphical elements. The method can also include executing a target manager application configured to output a target instance image file based on the target template data file and based on data to be encoded. The method can also include executing a detection application configured to: receive a captured image of a printed target instance produced from the target instance image file, apply detection data to the captured image, wherein the detection data is based on the target template data file, match a detection contour defined in the detection data to the captured image, sample each of the plurality of graphical elements from the captured image, and decode the data based on the sampled plurality of graphical elements.

In one aspect, a non-transitory computer readable medium can be encoded with instructions that cause a computer to execute a template design application. The template design application can be configured to receive user input specifying a design for a machine-readable target. The user input can include a specification of a border shape, and a specification of each of a plurality of graphical elements used to encode data based on color, wherein each specification includes a shape. The template design application further can be configured to identify a contour of the border shape as a detection contour configured to be recognized by a detection application. The template design application further can be configured to provide an indication to a user of whether: the contour is a not closed path, the contour does not include at least a predetermined minimum number of segments, any of the segments are less than a predetermined minimum relative size, the border shape does not maintain at least a predetermined minimum relative width in relation to the contour, and any of the element shapes are less than a predetermined minimum relative size. The template design application further can be configured to output a target template data file including a definition of the detection contour, and a definition of the plurality of graphical elements.

In one aspect, the design application can be further configured to determine whether: the contour is a not closed path, the contour does not include at least the predetermined minimum number of segments, any of the segments are less than a predetermined minimum relative size, and any of the element shapes are less than a predetermined minimum relative size.

In one aspect, the design application can be further configured to determine whether the border shape does not maintain at least a predetermined minimum relative width in relation to the contour.

In one aspect, the user input can further include: a specification of a color for the border shape, a specification of a color for a clear space area that abuts the border shape along the detection contour, and a specification of two colors for each of the plurality of graphical elements. The design application can be further configured to determine whether: there is at least a predetermined minimum amount of color contrast between the border shape and the clear space area, and there is at least a predetermined minimum amount of color contrast between the two colors specified for each of the plurality of graphical elements.

In one aspect, the user input can further include a specification of a shape of the clear space area. The design application can be further configured to provide an indication to a user of whether the shape of the clear space area does not maintain at least a predetermined minimum relative width in relation to the contour on an opposite side from the border shape.

In one aspect, the design application can be further configured to determine whether the shape of the clear space area does not maintain at least a predetermined minimum relative width in relation to the contour on an opposite side from the border shape.

In one aspect, a computer system includes: at least one processing unit; a display; at least one user input device; and a memory storing computer code for execution by the at least one processing unit to operate a template design application. The template design application can be configured to receive, from a user through the at least one user input device, user input specifying a design for a machine-readable target. The user input can include a specification of a border shape, and a specification of each of a plurality of graphical elements used to encode data based on color, wherein each specification includes a shape. The template design application can be configured to identify a contour of the border shape as a detection contour configured to be recognized by a detection application. The template design application can be configured to provide an indication to a user of whether: the contour is a not closed path, the contour does not include at least a predetermined minimum number of segments, any of the segments are less than a predetermined minimum relative size, the border shape does not maintain at least a predetermined minimum relative width in relation to the contour, and any of the element shapes are less than a predetermined minimum relative size. The template design application can be configured to save in the memory a target template data file including: a definition of the detection contour, and a definition of the plurality of graphical elements.

In one aspect, a system includes one or more computers. The one or more computers can execute a template design application configured to receive user input specifying a design for a machine-readable code and to output a code template data file. The one or more computers can execute a target manager application configured to apply data to be encoded to the code template data file in order to output a plurality of image files and detection data for detecting the machine-readable code. The one or more computers can execute a detection application configured to: receive a captured image of a machine-readable code, apply the detection data to captured image, match a contour defined in the detection data to the captured image, sample a plurality of graphical elements representing bits of encoded data, and output the encoded data.

In one aspect, the user input specifying a design for a machine-readable code includes a specification of a closed contour including a plurality of segments.

In one aspect, the user input specifying a design for a machine-readable code includes a specification of a closed contour comprising at least four segments.

In one aspect, the user input specifying a design for a machine-readable code includes a specification of a closed contour including at least four segments, wherein each segment is selected from the group consisting of a line, an arc and a curve.

In one aspect, the user input specifying a design for a machine-readable code includes a specification of a shape for each of the plurality of graphical elements.

In one aspect, the detection application is further configured to: determine a homography based on the image and the detection data, and output the homography.

In one aspect, the detection application is further configured to: perform an error correction on the encoded data, determine whether the encoded data is valid based on an algorithmic specification of valid bit codes, and discard encoded data that has been determined to be invalid.

In one aspect, the detection application is further configured to provide homography and encoded data to an augmented reality application.

In one aspect, the detection application is configured for execution on a mobile device.

In one aspect, the target manager application is further configured to insert any of one or more instances of different non-functional designs into a placeholder for a non-functional design specified in the code template data file.

BRIEF DESCRIPTION OF THE DRAWINGS

FIG. 1A illustrates an example machine-readable code that can be created by a user in accordance with one embodiment.

FIG. 1B illustrates a map showing different areas of significance within the example code of FIG. 1a.

FIG. 2 illustrates example machine-readable codes that can be created in accordance with various embodiments.

FIG. 3A illustrates a schematic template of an example machine-readable code showing locations of the centers of several graphical elements where an automated image analysis samples for one or another of contrasting colors to extract encoded data.

FIGS. 3B and 3C illustrate how different data can be encoded into the code for the template by varying the colors of the graphical elements.

FIG. 10 illustrates a dialog box that appears upon running a Setup script within Adobe Illustrator when designing a VuMark.

FIG. 12 illustrates an expanded view of the layers palette with the twelve layers that are created by the Setup script to hold the various parts of a VuMark as they are shown in Adobe Illustrator.

FIG. 13 illustrates an expanded view of an example VuMark Feedback artboard in Adobe Illustrator.

FIG. 15 illustrates a web page user interface for uploading a VuMark SVG file to a database hosted on a web-based Target Manager.

FIG. 16 illustrates a web page user interface for generating a VuMark instance from the web-based Target Manager.

FIG. 17 illustrates a Contour path drawn around the Border and Clear Space areas in an example VuMark design.

FIG. 18 illustrates examples of how the Verify script visually indicates verification of code Element sizes on the Main Design artboard.

FIG. 19 illustrates a screenshot of how a detected VuMark having a String type encoding an URL might appear in a Vuforia mobile application.

FIGS. 20A and 20B illustrate portions of a non-conforming and a conforming Border and Clear Space configuration respectively, as would be shown after running the Verify script.

FIGS. 21A and 21B illustrated examples of non-rotationally symmetric and rotationally symmetric contours, respectively.

FIGS. 22A, 22B and 22C illustrate Asymmetry Markers added to rotationally symmetric contours of orders 5, 2 and 4 respectively.

FIG. 23 illustrates various examples of VuMark Contours that would and would not be acceptable.

FIG. 24 illustrates a largest dimension of an example VuMark.

FIG. 25 illustrates examples of VuMark Contours that have conforming and non-conforming angles.

FIG. 26 illustrates examples of conforming and non-conforming VuMark Border and Clear Space areas.

FIG. 27 illustrates additional examples of conforming and non-conforming VuMark Border and Clear Space areas.

DETAILED DESCRIPTION

Figure 4:
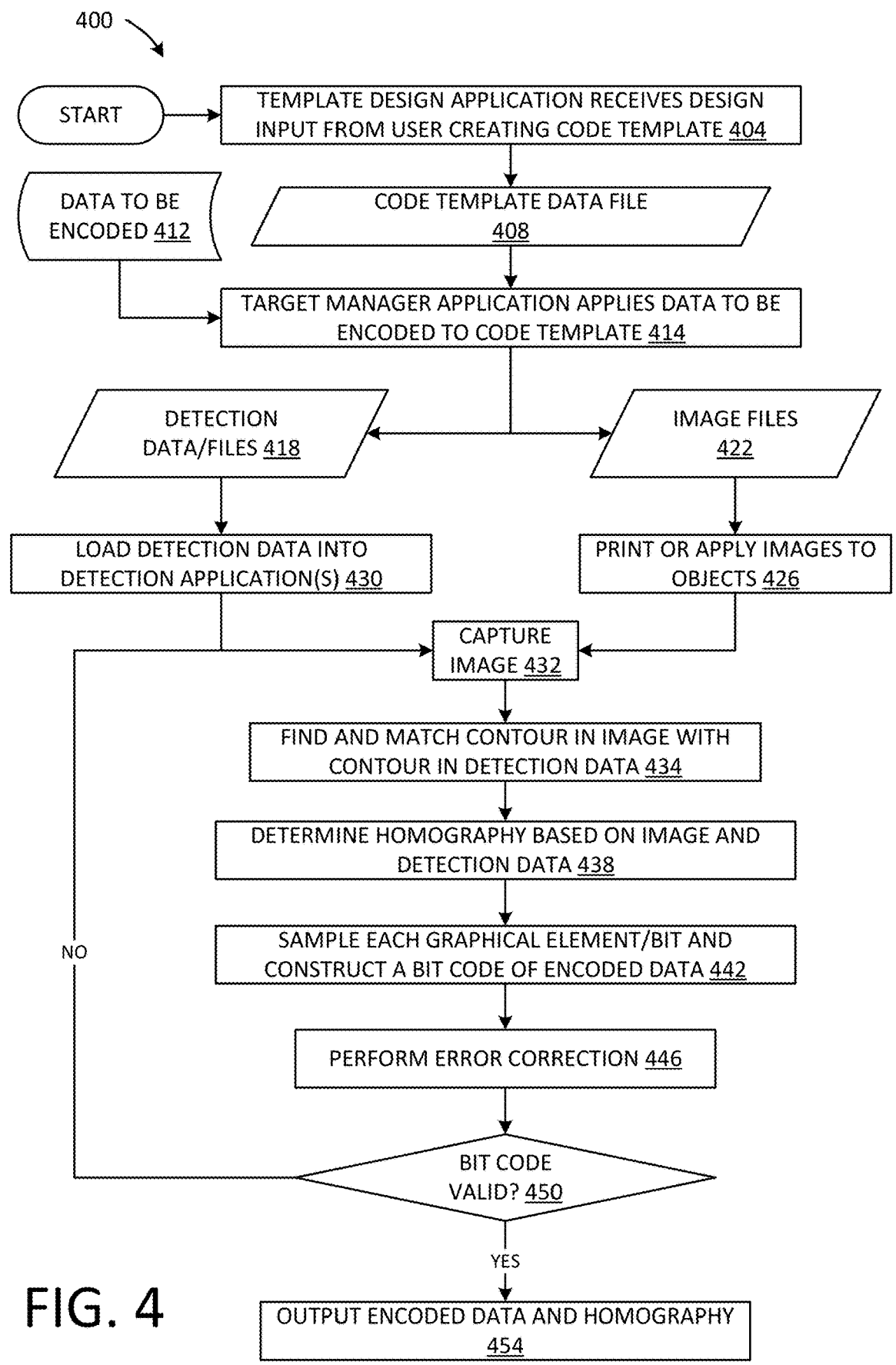
FIG. 4 illustrates a flowchart depicting a process for creating and detecting user-designed machine-readable codes in accordance with one embodiment.

In the following description, references are made to various embodiments in accordance with which the disclosed subject matter can be practiced. Multiple references to "one embodiment" or "an embodiment" do not necessarily refer to the same embodiment. Particular features, structures or characteristics associated with such embodiments can be combined in any suitable manner in various embodiments. References are also made to the accompanying drawings in which the same reference numbers are used throughout to refer to the same or like components.

Overview and General Implementation

FIG. 1A illustrates an example machine-readable code 100, also referred to herein as a target, that can be created by a user in accordance with one embodiment. FIG. 1B illustrates a map 120 showing different areas of significance within the code 100 of FIG. 1A.

Referring to FIGS. 1A and 1B, the code 100 includes a detection contour 104 that can be defined by a user. The detection contour 104 delineates a transition between a first area, referred to as a border 105, and a second adjacent area of a contrasting color, referred to as a safety area or clear space 106. For example, one of the border or safety area could be black and the other white, but other colors with sufficient difference in contrast or brightness to be detected during automated image analysis could be used. In one embodiment, the detection contour 104 can be any geometric closed outline composed of one or more connected geometric primitives such as lines, arcs or curves. In one embodiment, the detection contour 104 outline need not be closed.

In certain embodiments, the definition of the contour can be limited or constrained, such as to be composed only of straight segments in order to improve performance of a code recognition application. In one embodiment, the length of a smallest side of the contour should be between 10% and 20% or more of the largest cross section. In one embodiment, the width of the border 125 should be no less than 5% of the width of the largest cross section of the target, but other minimum widths can be used, such as no less than 1% or 2% of the largest cross section. The use of greater widths can improve the performance of code detection.

As shown in FIGS. 1A and 1B, the illustrated contour 104 includes at least four segments that define at least four points between the segments. The use of at least four segments defining at least four points facilitates the computation of position and orientation of the machine-readable code with respect to a camera that can be used to capture the image. A closed contour including at least four segments, and therefore at least four vertices, can be used to compute the homography (3D transformation) between a two-dimensional representation as captured by a camera (and deformed due to perspective projection of the camera) and the actual geometry of the marker. In one embodiment, an orientation notch or feature can be optionally added to a location on the contour to assist in orienting the contour, such as when the contour has a symmetric shape.

The code 100 also includes a set of multiple user-defined graphical elements 108, where each of the graphical elements (which may also be referred to as "bits" or "code elements") represents a bit of information to be encoded into the code. The locations of the multiple graphical elements 108 are shown in the map of FIG. 1B. Each of the graphical elements can be formed of any solid filled shape, and each of the graphical elements can be the same shape as or different from any or all of the other graphical elements. In one embodiment, the locations 144 of the graphical elements do not overlap with each other or with the contour 104. Each graphical element can be specified in two contrasting colors or states, preferably bright and dark, that can be distinguished during image analysis such that the graphical element can be used to represent a binary bit of information. For example, a two-bit code can have one element specified in yellow and blue while the other element is specified in pink and brown to represent bright and dark versions of each bit. In alternate embodiments, more than two colors, each having a distinguishable contrast can be used to represent more than two values for each graphical element.

When taken together, the bits represented by the multiple graphical elements can be used to digitally encode substantially any information into the code. In one embodiment, each graphical element 108 is associated with a location, optionally near the center of the graphical element, at which a value for the graphical element is sampled during image analysis, although the size and shape of the graphical element may extend beyond the sample location. In varied embodiments, the user-defined graphical elements 108 can be located within the contour 104, outside of the contour, or both inside and outside of the contour. Inclusion of all of the design elements within the contour may, however, increase robustness of detection. The graphical elements 108 can optionally be randomly scattered and need not be contiguous or connected. In one embodiment, the size of each of the graphical elements is between 5% and 10% or more of the largest cross section of the contour. In one embodiment, the size of a graphical element can be defined as the width of the largest circle that can fit within the graphical element.

The code 100 can also include a design 110, which is shown in the design area 130 in the map 120 of FIG. 1B. The design 110 can be any user-defined illustration or image that can provide artistic value and/or information that can be directly understood by a person viewing the code. In one embodiment, the design is ignored during an automated image analysis process, and it does not contain any machine-readable information. In varied embodiments, the design 110 and design area 130 can occupy space within the contour 104, outside of the contour, or both inside and outside of the contour. The design can be used, however, in addition to the contour and graphical elements, for tracking the target in an augmented reality implementation.

FIG. 2 illustrates example machine-readable codes 202, 204, 206, 208, 210 and 212 that can be created in accordance with various embodiments.

Each of the machine-readable codes 202, 204, 206, 208 and 210 includes a respective contour 202A, 204A, 206A, 208A and 210A. The contours 202A, 204A, 206A, 208A, 210A each include at least four segments and would be suitable for determining the homography of the machine-readable code using automated image analysis. The code 202 also includes an orientation notch 202B, which can be specified and subsequently detected in order to orient the code. As described above with respect to FIG. 1, each of the codes 202, 204, 206, 208 and 210 is further based on a template that defines a set of multiple graphical elements, where each of the graphical elements represents a bit of information to be encoded into the code.

FIG. 3A illustrates a schematic template 300 of an example machine-readable code showing locations 302 of the centers of several graphical elements where an automated image analysis samples for one or another of contrasting colors to extract encoded data. FIGS. 3B and 3C illustrate how different data can be encoded into the code for the schematic template 300 by varying the colors of the graphical elements.

FIG. 4 illustrates a flowchart depicting a process 400 for creating and detecting user-designed machine-readable codes in accordance with one embodiment.

At a step 404, a template design application receives design input from a user creating a machine-readable design. The template design application can be a graphical design application, for example, an instance of Adobe Illustrator, augmented with custom scripting to capture the user-defined contour, the graphical elements and optionally any additional design to be incorporated into a code template. In one embodiment, the template design application can also be configured to receive input from the user relating to any specific encoding and/or error checking formats or processes to be applied to data to be encoded into the graphical elements. The design application outputs and optionally stores a code template data file 408, which can be, for example, encoded as a scalable vector graphics (SVG) file. The code template data file 408 can include, for example, definitions of the border, clear space, contour, graphical elements, and additional non-functional design, as well as any colors for the foregoing. In one embodiment, instead of specifying the actual additional non-functional design in the design application, a placeholder optionally identifying a location or area for subsequent insertion of any of one or more different non-functional designs can be included.

At a step 414, a target manager application applies data to be encoded 412 to the code template data file 408 to create one or more instances of machine-readable codes. In one embodiment, the target manager application can be configured to use a specific encoding method along with any associated error correction algorithm, associating bits of encoded data with various graphical elements specified by the code template data file 408. The length and therefore the capability of any bit code to be encoded is limited by the number of graphical elements defined in the template, which in turn can be defined by the user. Therefore, any encoding scheme can be used on top of the raw bit code. Further, any error correction scheme compatible with the chosen encoding scheme can also be used. In one embodiment, the target manager can also be configured to insert any of one or more instances of different non-functional designs into a placeholder for a non-functional design specified in the template data file 408.

In one embodiment, the target manager application outputs both a set of image files 422 as well as code detection files or data 418. The image files can be, for example, portable network graphics, encapsulated postscript vector graphics, or any other suitable type of image file. The code detection data 418 can be stored and/or output in any suitable format readable by a detection application. At a step 426, an appropriate system can be used to print or apply the images from the image files 422 to objects or items to be subsequently scanned.

At a step 430, detection data 418 is loaded by or into detection applications executing on devices or computers used for detection of the machine-readable codes. In typical configurations, the detection applications can be apps executing on consumer users' mobile devices, which will have a camera for capturing images or video. The apps can also or alternatively execute on or in conjunction with other augmented reality hardware such as headsets, head-mounted displays, or smart glasses that overlay imagery on the user's view. The apps can be pre-loaded with the detection data or updated periodically with new detection data. Apps can also be configured to retrieve updated detection data as required or on a periodic basis. An application will typically be configured with detection data for multiple machine-readable codes.

At a step 432, the detection application performs an image capture. At a step 434, the detection application attempts to find and match contours in the captured image with detection data for any of multiple machine-readable codes for which the app is configured to scan. Once a match is found, at a step 438, the detection application determines the homography (3D position and orientation) of the machine-readable code using the detection data.

At a step 442, the detection application samples each graphical element specified in the detection data and constructs a bit code of encoded data using a compatible scheme to that used to encode the data into the graphical elements. At a step 446, the detection application optionally performs an error correction on the bit code using a compatible scheme to that used to encode the data into the graphical elements. At a step 450, the detection application determines whether the determined bit code is valid. In one embodiment, the number of bits is configured to provide a range of values that substantively exceeds the range of data to be encoded. An algorithmic check can therefore be performed to determine whether the particular bit code produced is one of a much smaller set of valid codes than is supported by the range of bits into which the data is encoded. For example, if 10 extra bits are included in the graphical elements in addition to those that would be needed to encode the range of actual encoded values, then only 1 out of $2^{10}$ possible encoded values using all the bits would be valid. This sparse population can be leveraged to identify most false positive scans. If an invalid bit code is identified, the process returns to the image capture step 432 for another scan and attempt at decoding. On the other hand, if the bit code is valid, then at a step 454, the encoded data and homography are output.

The output of the process 400, including the encoded data and homography can be leveraged, for example, by an augmented reality application to overlay positionally accurate metadata or graphics within video or images. In some embodiments, only the encoded data may be of interest and the homography data can either be discarded or not determined. In some embodiments, user-defined machine-readable codes that do not support full homography can be used, in which case, the homography related steps of the process 400 can be omitted.

Figure 5:
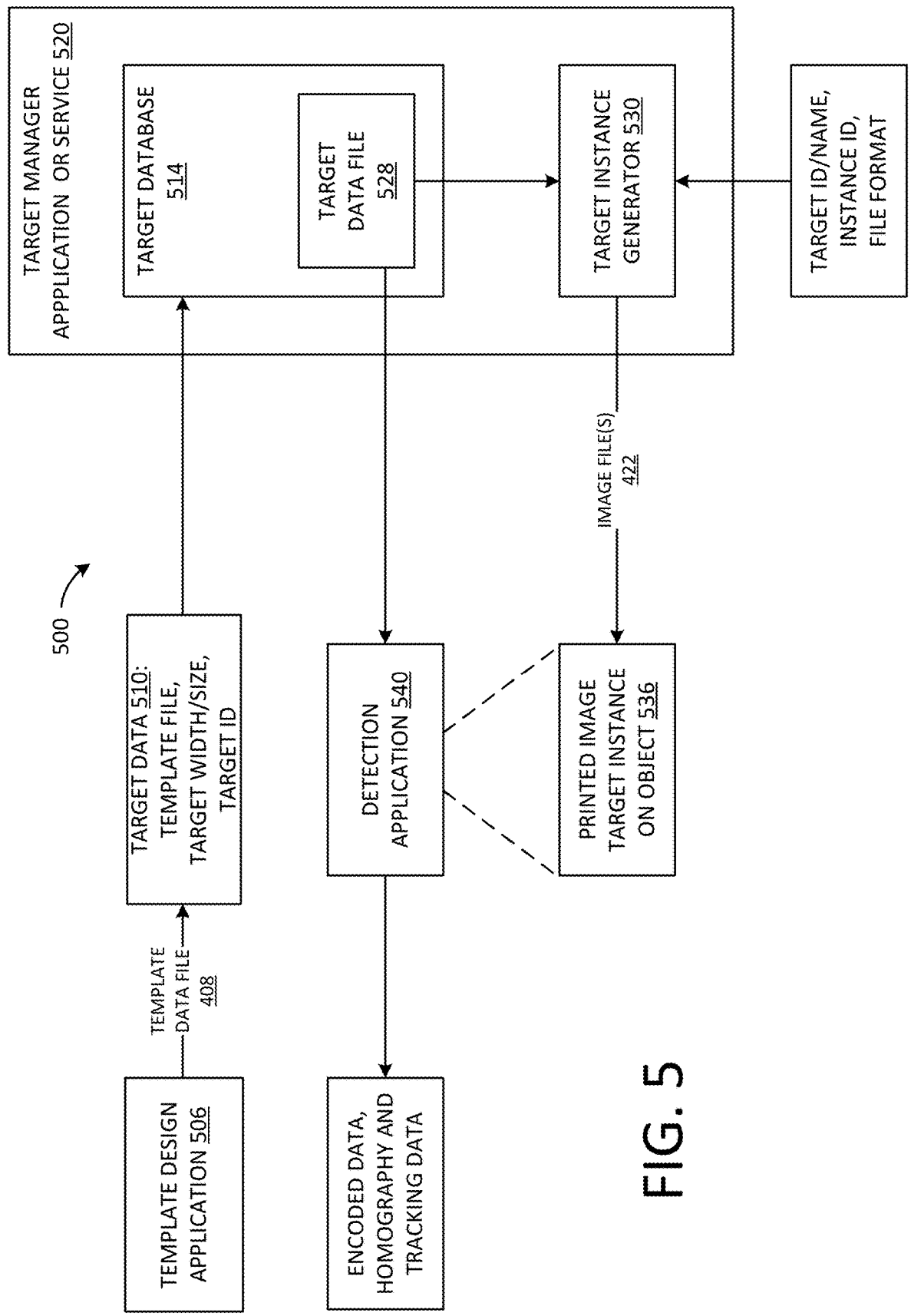
FIG. 5 illustrates a system architecture and data flow for generating and using scannable targets in accordance with one embodiment.

FIG. 5 illustrates a system architecture and data flow 500 for generating and using scannable targets in accordance with one embodiment. The system architecture and data flow 500 illustrated in FIG. 5 should be viewed in conjunction with and applicable to the flowchart 400 of FIG. 4. As discussed above with reference to FIG. 4, a developer user uses a template design application 506 to generate a template data file 408. The user can the load the template data file 408, along with other target data 510, such as a target width or size (which will be discussed below), as well as a target identifier (ID or name for the target) into a target database 514. The information in the template data file 408 and the other target data 510 can be stored in the database as a set of target data or a target data file 528 for the target. Accordingly, the target data or target data file 528 can be based on the template data file 408. The target database 514 can be created and maintained by a target manager application 520, which can be a cloud based or web-accessible service. Alternatively, the target manager application 520 can be implemented as a local service or application executing on a developer user's computer. The functionality of the target manager 520 can optionally be integrated with the functionality of the template design application 506 as a single target design and manager application.

For each set of target data or target data file 528, a developer user can use a target instance generator 530 to create image target instances 536 of the scannable target in the form of image files 422. The image files 422 are then printed as image target instances 536 on physical objects to be scanned. For each image target instance 536 to be created, a developer user can supply or identify a target ID or name to retrieve the proper target from the target database 514, an instance ID representing the data to be encoded in the target instance, as well as an image file format, such as SVG, PDF or PNG for the image file 422 to be produced.

The target instance generator 520 can be a function or component of the target manager 520 or it can be a separate application. The individual instances of scannable targets can be generated based on individual requests by a developer user, such as through a web-based interface supported by a web service implementing the target manager application 520. In addition or alternatively, an API can be made available to allow developer users to programmatically create multiple instances of scannable targets based on databases or files containing multiple instance IDs.

The target manager application 520 can be configured to maintain one or more different target databases to serve multiple users or to enable different projects to be handled separately. Each target database 514 can be configured to store one or more target data files for one or more scannable targets. A target database 514 including one or more target data files 528 (also referred to as code detection files or data 418 with reference to FIG. 4 above) can be loaded onto a detection application 540 configured to execute on a end-user's computing device, such as a mobile phone. The individual target data files 528 themselves can alternatively or additionally be loaded or installed in a detection application 540 without being contained in a database 514.

With the target database 514 loaded or installed, the detection application 540 can be used to output one or more of encoded data from the scanned target, homography based on the scanned target, and tracking data based on the location of the scanned target within a video field of view being processed by the application. The detection application 540 can be or be part of an augmented reality application configured to display overlays or augmentations within a field of view of a displayed video capture including a scanned target. The augmentation to the video can include, for example, an outline or reproduction of the scanned target, the data encoded by the scanned target and/or other augmentations based on the data encoded by the scanned target. For example, the encoded data can include a hyperlink that specifies and initiates retrieval of an image or other data to be displayed as the augmentation within the video field of view. Alternatively, the detection application 540 can be or be part of a code scanning application configured to output the data encoded by the target, with or without homography.

Figure 6:
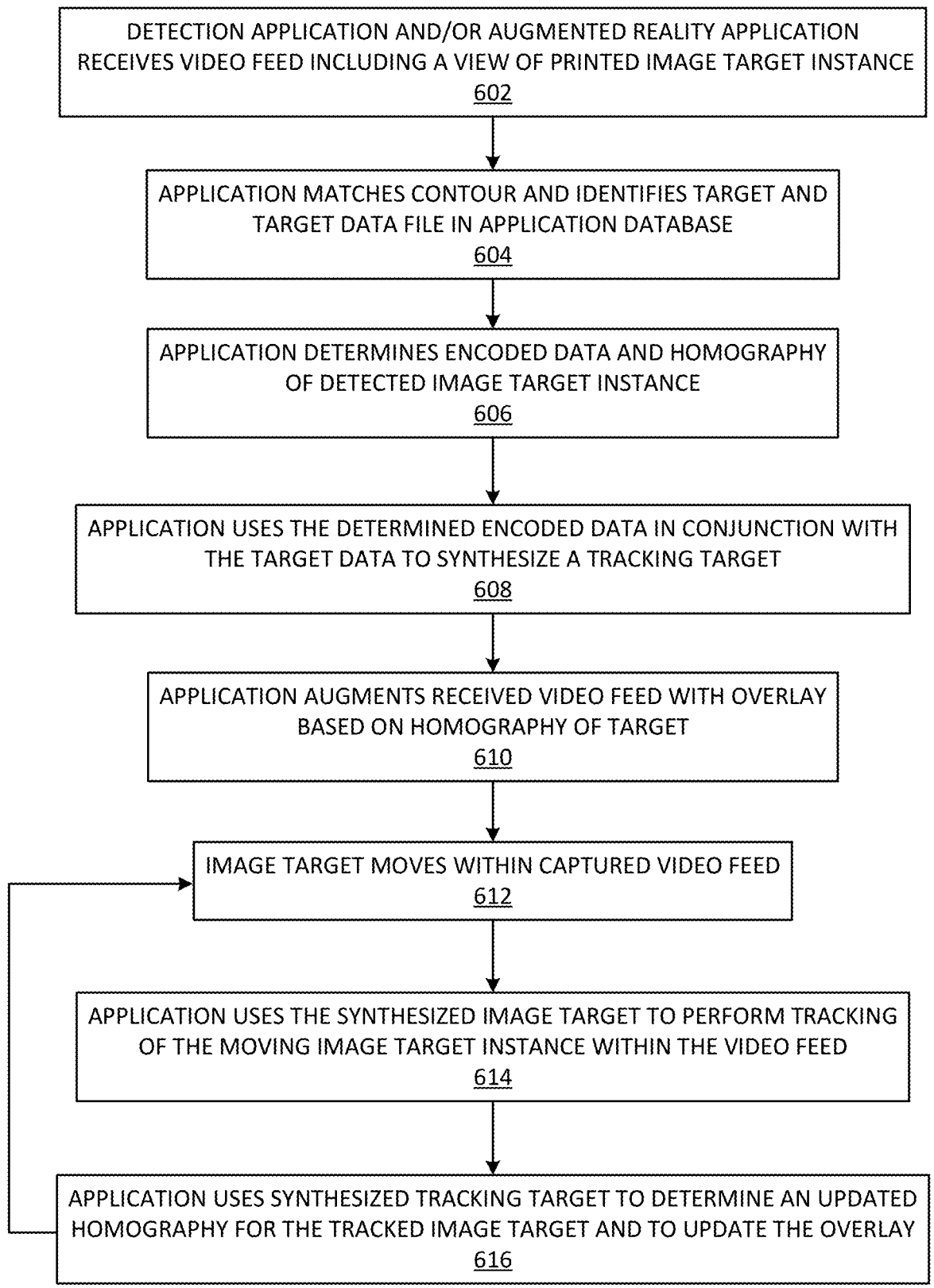
FIG. 6 illustrates a process for tracking a printed image target instance on a scanned object within a field of view of an augmented reality application.

FIG. 6 illustrates a process 600 for tracking a printed image target instance 536 on a scanned object within a field of view of an augmented reality application. The process 600 can be used in conjunction with the process 400 of FIG. 4 and the architecture 500 of FIG. 5.

At a step 602, an augmented reality application, such as the detection application 540, can be configured to receive a video feed including a view of a printed image target instance 536 on a scanned object. At a step 604, the application 540 attempts to find and match contours in the captured video with contours specified by any of the target data files 408 stored in the application's target database 514. The step 604 can include or be similar to the step 434 of the process 400 discussed above. During the step 604, the detection application 540 also identifies the target identifier and its associated target data file 528 based on the matched contour (this is implicit in the step 434, above). At a step 606, the application can be configured to perform the steps 438, 442, 446, 450 and 454 of the process 400 above, or similar steps, in order to determine encoded data and homography of the detected image target instance 536.

At a step 608, the application uses the determined encoded data in conjunction with the set of target data or target data file 528 for the target to dynamically synthesize a tracking target, including the details imparted by the encoded data, for use in subsequent tracking of the target within the video feed. The tracking target can be, for example, an equivalent image file to that created for the printed target instance 536. To create the tracking target, the application can use a similar or the same process as was used by the target instance generator 530 to create the image file 422 used to create the printed image target instance 536.

At a step 610, the application can optionally augment the received video feed by adding an overlay over or adjacent to the image target as shown in the field of view. The augmentation can be, for example, an overlay of the tracking target or recreated equivalent image file generated in the step 608 on top of the actual detected image target instance 536 in the field of view. Alternatively, the overlay can be a generic or outline image based on the target template without taking into account the encoded data. In either case, the contour of the scanned image target instance 536 can be highlighted or emphasized in the overlay so that the detection of the scanned image target instance is made clear to the user of the application viewing the augmented video. In addition to or in the alternative to displaying an overlay, the encoded data read from the scanned image target instance can be displayed to the user in or in conjunction with the augmented video.

At a step 612, the image target instance moves within the captured video feed, either through movement of the camera or by movement of the object on which the image target instance is disposed. When this happens, an additional frame or frames are captured subsequent to the frame or frames based upon which the image target instance was recognized and decoded. In these subsequent frames, the image target instance will be in a different relative location and/or orientation within the video feed. In order to continue augmenting the video with an overlay or other information relative to the location of the image target instance within the video feed, the image target instance needs to be tracked as it moves within the video feed.

At a step 614, the application uses the synthesized tracking target to perform the subsequent tracking of the moving image target instance 536 within the video feed. By using the synthesized tracking target, which is based on the determined encoded data and therefore contains more information or detail based on which to track the target, a more accurate tracking can be achieved than by continuing to track or recognize the target instance 536 based on the contour alone. Any background imagery or other detail that forms part of the image target instance, aside from the encoded data, can also be used in creating the synthesized tracking target.

At a step 616, the application uses the synthesized tracking target to determine an updated homography for the tracked image target instance 536 based on the synthesized tracking target, and the augmentation of the video feed can be updated accordingly. The steps 614 and 616 can be repeated as the image target instance continues to move within the video feed.

Figure 7:
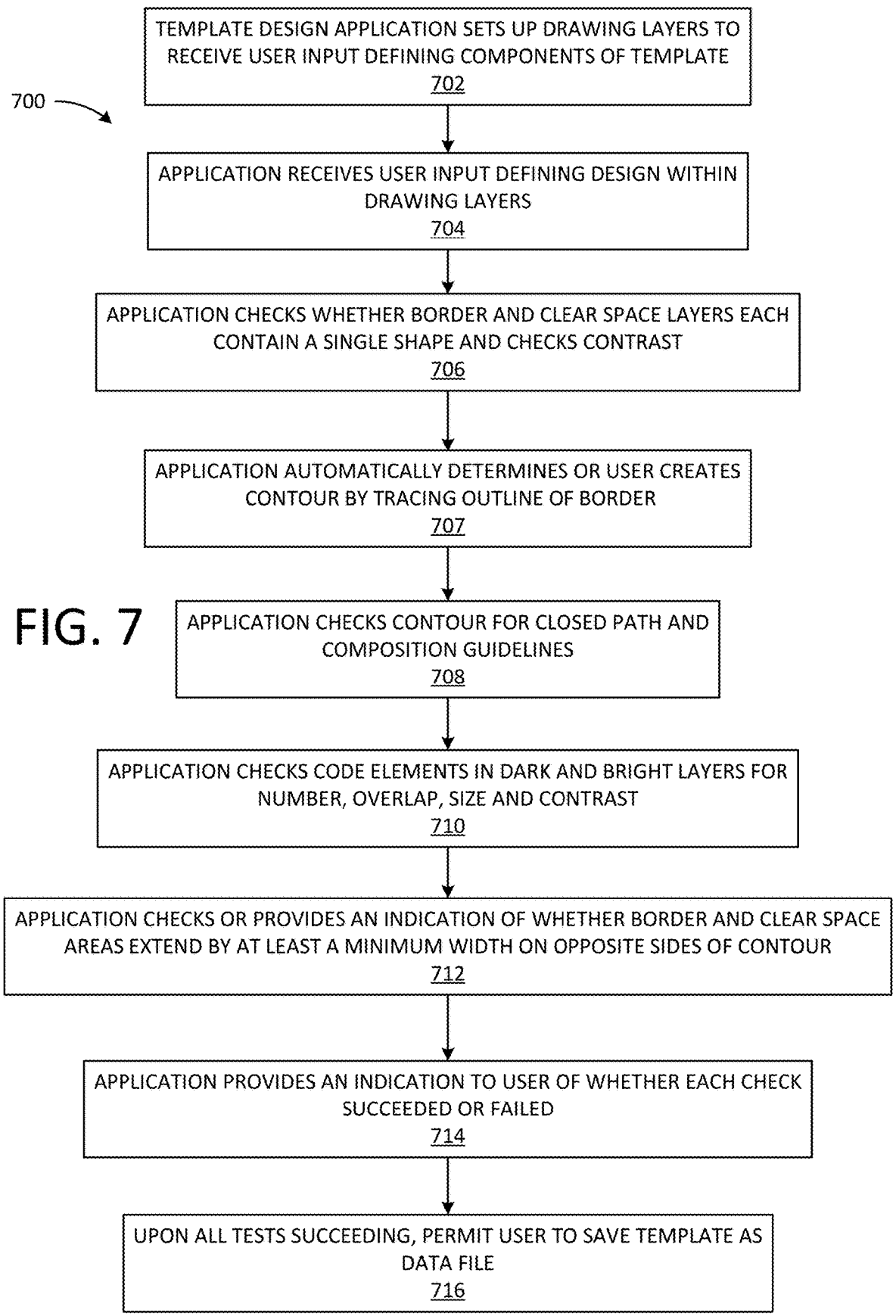
FIG. 7 illustrates a method that can be executed by a template design application to receive and check the validity of user input defining a design for a target template.

FIG. 7 illustrates a method 700 that can be executed by a template design application 506 to receive and check the validity of user input defining a design for a target template. The method 700 can be used to check that the user-supplied design satisfies certain predefined design guidelines or requirements configured to improve or ensure the performance of a scannable image target. The guidelines can be configured to improve or ensure the reliability of a detection application in decoding a target's encoded data and in determining homography. Although the steps of the method 700 are shown in a particular order, the steps can generally be reordered in other permutations in practice. The method 700 can be executed by running one or more scripts or plug-ins within the template design application 506, which can be a vector graphics editor application such as Adobe Illustrator. Alternatively, the template design application can be a special purpose application specifically designed for creation of template data files 408 and/or target data files 528.

At a step 702, the template design application 506 can be configured to set up a number of drawing layers within which user input defining various components of the target template can be drawn or specified by a developer user.

At a step 704, the application 506 receives user input defining the design in the drawing layers. The user input can include several components and each component can be drawn in a different layer. A border shape, which defines the border 105 can be drawn in a border layer. A safety area shape, which defines the safety area 106 (also referred to below as the "Clear Space") can be drawn in a clear space layer. A set of graphical element shapes, which define the graphical elements 108 (also referred to as "code elements" below) can be drawn in a dark color in a dark elements layer. Similarly, a matching set of identically drawn and positioned graphical element shapes 108, can be drawn in a light color in a light elements layer. Each of the dark elements layer and light elements layer define a different state, by way of color, for each element such that either the light or dark state can be chosen in a target instance for a particular element in order to represent a bit of information.

At a step 706, the application 506 checks to determine whether each of the border and the clear space layers contain a single shape and whether the contrast between the border and clear space shapes is at least a predetermined minimum value. In one embodiment, the specification of the clear space can be skipped and a plain white background can be relied upon to delineate the boundary between the border and what would otherwise be the clear space.

At a step 707, in one embodiment, the application 506 can create or identify a contour automatically or programmatically by detecting an outline or boundary between the border 105 and the safety or clear space area 106. In one embodiment, the user can use a pen tool to manually outline the border shape in order to create the contour. If the border shape is defined using anchor points at its vertices, the user can snap the pen tool to those anchor points when creating the contour to precisely track the outline of the border. The manual creation of the contour will be discussed further by example in the sections below. The application 506 can set up a separate contour layer to receive user input defining the contour 104 or to contain the automatically created contour.

At a step 708, the application 506 checks to determine whether the contour is a closed path and that the closed path satisfies certain composition guidelines. The composition guidelines can include, for example, that the closed path is constructed of between 4 and 20 straight segments, with each being a minimum size, such as 3 percent of the width of the overall design.

At a step 710, the application 506 checks to determine whether a necessary and identical number of code elements have been drawn in each of the dark elements and light elements layers to support an amount and/or type of data desired to be encoded. The application can also check whether the code elements in the dark elements and light elements layers overlap identically. The application can also check whether the code elements each satisfy size guidelines, such as, for example, being a minimum of 3 percent of the width of the overall design. The application can also check whether the code elements in the dark elements and light elements layer have a sufficient amount of contrast.

At a step 712, the application can be configured to determine whether each of the border 125 and the safety area or clear space 126 extend by at least a minimum width on opposite sides of the contour path 104, such as discussed with reference to FIGS. 1A and 1B above. In one embodiment, with respect to the step 712, the application can be configured to draw a partially opaque overlay in a vivid color, such as magenta, centered on and tracing along the contour (discussed below with reference to FIGS. 14A and 14E). The partially opaque overlay can be configured to indicate to the user a needed width of each of the border 125 and the safety area or clear space 126 on opposite sides of the contour in order to meet the guidelines. This overlay allows the user to visually verify that the border 125 and the safety area or clear space 126 meet minimum width guidelines. In this embodiment, the application need not perform this check automatically and instead can provide to the user an instruction to verify that this guideline has been satisfied. This embodiment can provide the user more flexibility in crafting a design, and there can be some leeway in the capability of the detection application to properly function even if the width guidelines are not precisely met. This embodiment, including a manual verification by the designer user, is described in additional detail with respect to the commercial implementation below.

At a step 714, in each of the foregoing steps, with the optional exception of the step 712, the application can be configured to provide to the user a pass/fail indication of whether each check succeeded or failed. In further embodiments, additional and/or different guideline checks on the design can be included in additional and/or different steps. These additional checks can include any of the guidelines or recommendations set out in this disclosure. At a step 716, in the case that all the performed guideline checks or tests succeed, the application can be configured to permit the user to save or export a valid design as a template data file 408.

Vumark Commercial Implementation

The following sections describe a commercial implementation of one embodiment, referred to as VuMark™ machine-readable codes and their associated programs, applications and systems, which were released in August 2016 under the Vuforia™ brand by the Applicant, PTC Inc. Certain variations on this embodiment are also disclosed below. Any features or aspects of embodiments and variations thereof described above can be variously combined with features or aspects of embodiments and variations thereof described below in yet additional embodiments that are specifically contemplated by this disclosure, but which will not be individually recited.

Figure 8:
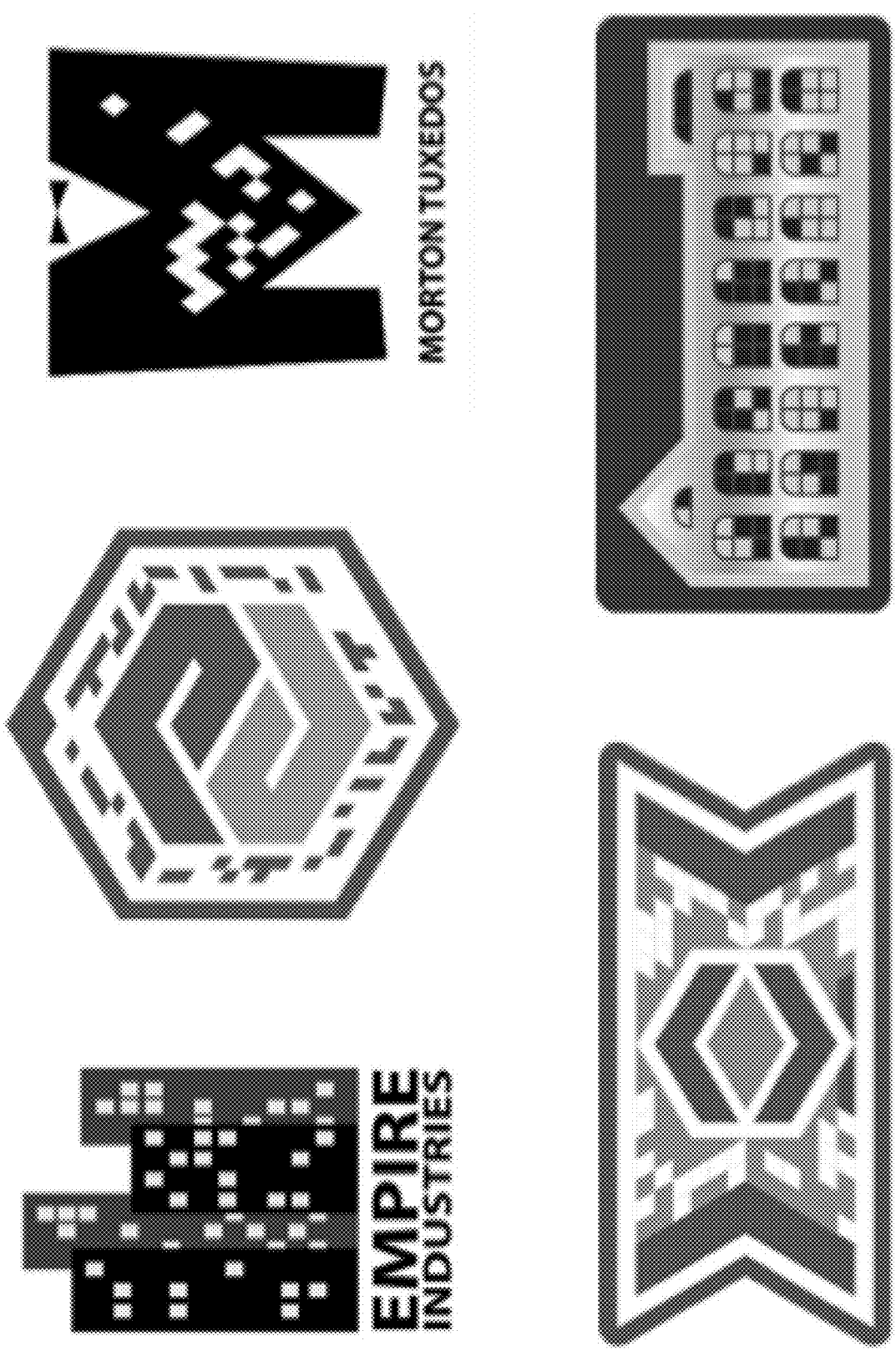
FIG. 8 illustrates example VuMarks, which are customizable Vuforia targets that can both store encoded data as well as support an augmented reality experience.

FIG. 8 illustrates example VuMarks, which are customizable Vuforia targets that can both store encoded data as well as support an augmented reality (AR) experience. Vuforia is a well-known augmented reality Software Development Kit (SDK) that enables the creation of augmented reality applications for mobile devices. A VuMark provides a simple mechanism for encoding data such as an URL or a product serial number into a machine-readable code, while allowing design freedom for a custom look and feel. VuMarks overcome limitations of existing matrix bar code solutions that do not support AR experiences and can detract from a product's appearance.

VuMarks have application in both the enterprise and consumer markets. One example of VuMark usage is for enterprises. By affixing VuMarks to manufactured equipment, enterprises can identify equipment or equipment parts. VuMarks can be used to overlay augmentations that indicate how to use equipment, such as with 3D step-by step instructions. VuMarks can be used to precisely register service and operations instructions to areas and surfaces to which they pertain, which leads to significant cost savings for employees operating and servicing equipment.

In the consumer market, VuMarks offer a reliable way to recognize and track toys, electronics and tools. VuMarks can be used on toys to register ownership and unlock digital content. Consumer brands can create 3D experiences that are designed to show how to use a product or to add value with new digital features.

VuMarks provide some of the same capabilities as previously available Vuforia ImageTargets in that they can be individually recognized and tracked by the Vuforia SDK. Both VuMarks and ImageTargets can be used to create rich Augmented Reality experiences, but there are also significant differences that make VuMarks especially useful for many enterprise and consumer applications. For example, VuMarks can present millions of uniquely identifiable instances, they can encode a variety of data formats, and they can enable differentiation among identical looking products, for example, by using different Instance IDs to encode product serial numbers. The same VuMark design or template can be used to encode a range of unique IDs or data. This enables the same general image to be used universally, but customized or instantiated to possess a unique identity and/or information in each of multiple instances.

VuMark designs are created in Adobe Illustrator using the VuMark Designer tool (described below), and then uploaded to the Target Manager (described below) as scalable vector graphics SVG files. In the Target Manager, VuMarks are added to VuMark databases that can be configured online and then downloaded from the Target Manager. The downloaded databases can be added to a Vuforia project in Unity (a well-known game engine), Android Studio, Xcode or Visual Studio 2015 and packaged with an app's executable. After a VuMark design has been uploaded to the Target Manager and added to a VuMark database, a user can generate instances of the design that encode unique identifiers, strings, numbers or bytes. VuMark instances can be downloaded from the Target Manager or retrieved programmatically using the VuMark Generation API. The VuMark instances, which can be downloaded as image files, can be printed on or affixed to objects for use with both Unity and native Vuforia apps in Java, C++ and C#.

Figure 9:
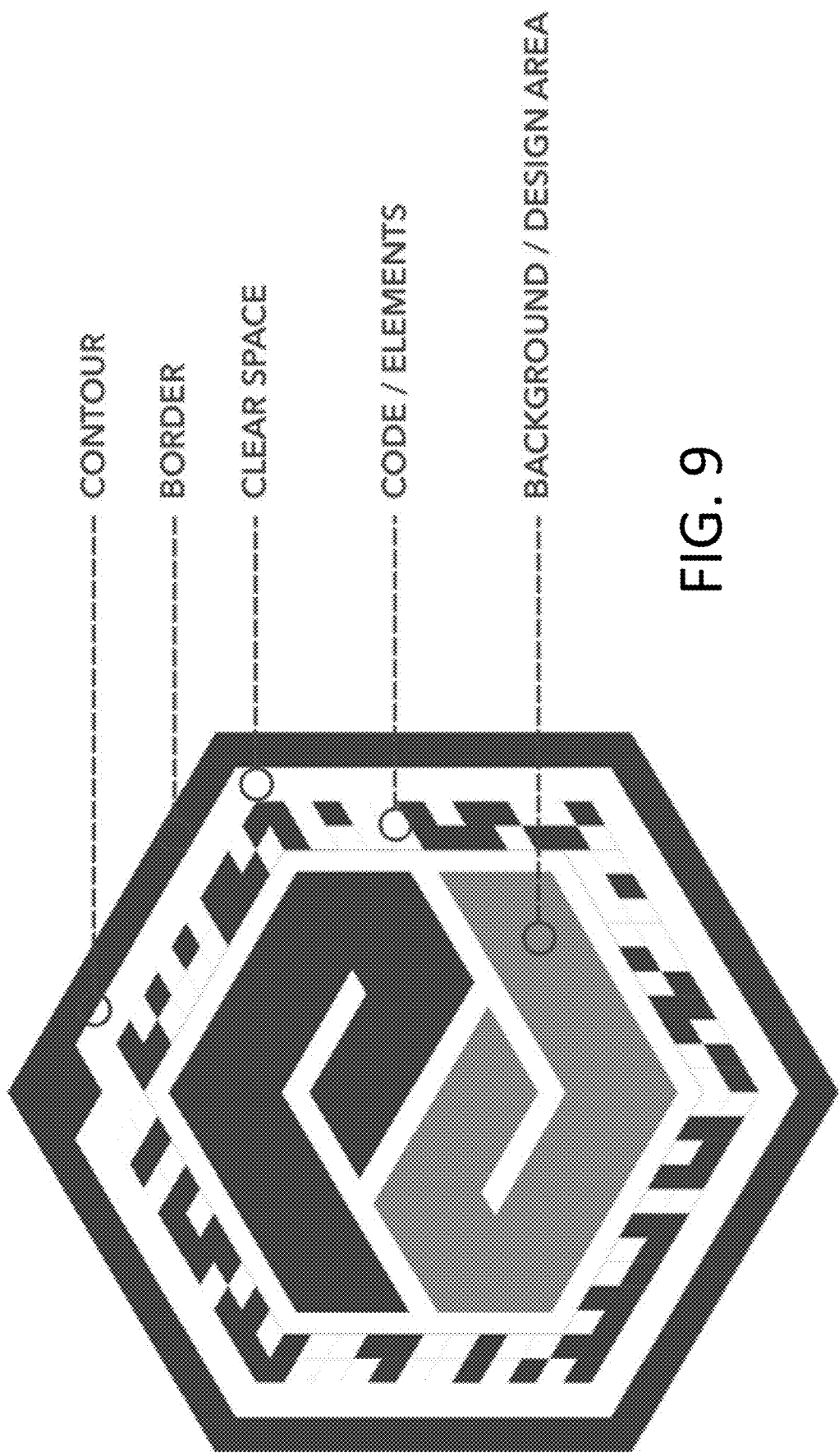
FIG. 9 illustrates an example VuMark showing five primary design components including the Contour, Border, Clear Space, Code Elements, and Background or Design Area.

FIG. 9 illustrates an example VuMark showing five primary design components, which will be discussed in additional detail below. The design components include the Contour, Border, Clear Space, Code Elements, and Background or Design Area.

The Border is typically the most identifiable and defining shape within the VuMark. In FIG. 9, the Border is the outermost shape made of six straight line segments forming a hexagon. The Border should be drawn in Adobe Illustrator as a filled path or a compound path.

The Clear Space is a blank area that appears adjacent to the border along its entire length. The Clear Space can be either inside or outside of the border and is used to ensure there is enough contrast for the Vuforia computer vision process to detect the Contour. In certain embodiments, the Clear Space can be omitted in favor of a transparent or white colored background assuming a dark Border is used. The Clear Space should be drawn in Adobe Illustrator as a filled path or a compound path.

The Contour is a path or line that appears where the Border and the Clear Space meet. In effect, the Contour is defined by the contrast between the two different colors of the Border and Clear Space. The Contour is the component that the Vuforia computer vision process first detects. After finding the Contour, the process looks for the code and "reads" it to identify the value or "ID" that is encoded within the VuMark. In Adobe Illustrator, the Contour can be created directly on the VuMark-Contour layer using Illustrator's Pen Tool, by manually rendering the underlying contrast border between the Border and the Clear Space anchor-by-anchor.

The Code Elements are shapes into which data is encoded in the VuMark by printing the shapes in "Dark" and "Bright" states. Every individual VuMark contains a unique Code, which is a visual representation of the Instance ID encoded in the VuMark. Every Element has two states: a "Dark" and "Bright" state. A unique code is generated by setting some of the elements in the Dark vs. Bright state (roughly 50% of the Elements in each state). Each Element should be drawn in Adobe Illustrator as a filled path or a compound path.

The Background or Design Area is a layer into which can be placed any parts of the VuMark that are not used for detection. There is substantial freedom in designing and placing content in the Background. A graphically rich background can increase the robustness of tracking by the Vuforia computer vision process, such as in an augmented reality environment.

Designing a Vumark in Adobe Illustrator

Adobe Illustrator can be used to design a custom VuMark and to export a corresponding SVG file that can be used to define the VuMark in the Target Manager. Three custom VuMark Designer scripts, namely the Setup, Verify and Export scripts, are used within Illustrator to support the creation, verification and export of a VuMark design. This section explains how to use the VuMark Designer scripts to define a VuMark's components within their corresponding layers in Illustrator.

The Setup script creates a new Illustrator file for a VuMark, which file will be referred to as the VuMark template. The Setup script automatically creates the layers into which a user can place various parts of the VuMark design.

The Verify script helps test the VuMark design by providing a list of design requirements, Pass/Fail results for each requirement, and suggestions for resolving any issues that may have been found. A user will typically run this script multiple times during the design process as they make changes to correct failed conditions.

The Export script is used to export the VuMark template as a Scalable Vector Graphics (SVG) file. A user runs this script once the design has been checked by the Verify script and is determined to be "ready for export". The user can then upload this SVG file into the Vuforia Developer Portal Target Manager to create the dataset that will be used within an iOS, Android, Unity, or Windows 10 application.

FIG. 10 illustrates a dialog box that appears upon running the Setup script. Note that each of the scripts can be accessed in Illustrator under File->Scripts, once the scripts have been installed in the appropriate directory and Illustrator relaunched. The dialog requests input for a Name, Type and ID Length for the VuMark. The Type and ID Length fields are used to choose the type of data to encode in the VuMark and this determines how many Elements the VuMark template should have. Given these inputs, the script configures a template accordingly.

There are three types of data that can be encoded in a VuMark. A String ID type consists of printable ASCII characters, in which case the entered ID Length represents the number of characters that can be encoded. A Numeric ID type consists of numeric digits 0-9, in which case the maximum numeric value to be encoded should be entered into the ID Length field. In an alternative embodiment, instead of entering the maximum numeric value to be encoded, the number of digits to be encoded can be entered. A Byte ID type consists of data in a byte format, in which case the entered ID Length represents the maximum number of bytes of data that can be encoded.

The Setup script calculates and displays a number of Elements that will be required to encode the VuMark's data based on the ID type and ID length selected by the user. The type of data and length of the value/ID that is encoded determine the number of Elements that is required to represent the data. The calculation can be based on a mathematically required minimum number of bits needed to represent the data. The calculation can also take into account an overhead for an additional number of Elements to be used to support error correction or reduce false readings. The additional Elements can be added to a theoretical minimum number of elements needed, creating a sparse set of valid codes, which limits false positive reads.

Figure 11:
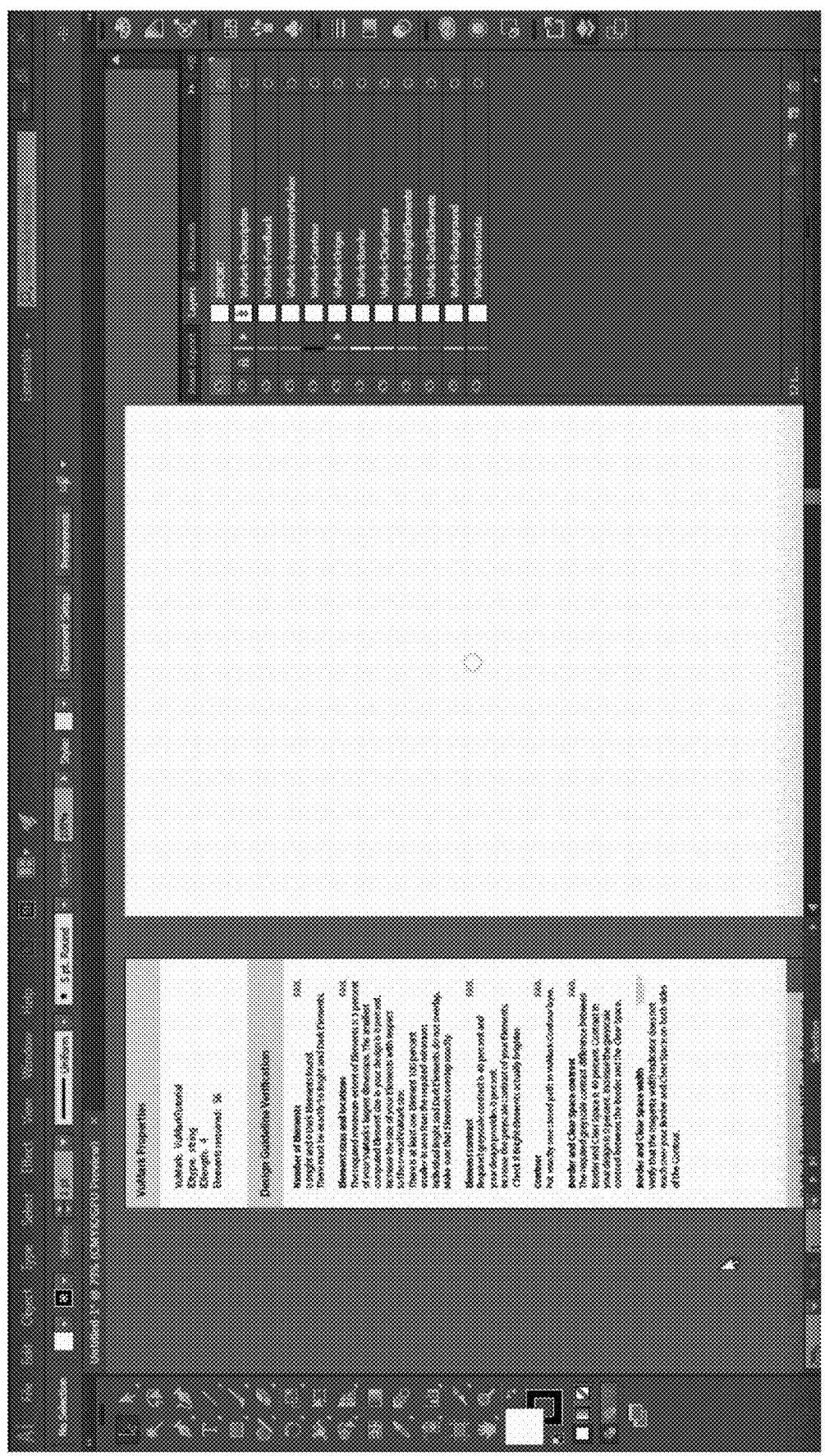
FIG. 11 illustrates a screenshot of Adobe Illustrator after the Setup script has been run with an ID type of String and an ID length of 4 specified, and the Continue button on the Setup dialog box selected.

FIG. 11 illustrates a screenshot of Adobe Illustrator after the Setup script has been run with an ID type of String and an ID length of 4 specified, and the Continue button on the Setup dialog box selected. Referring to FIG. 11, Illustrator displays a Main Design artboard, shown in the middle, a layers palette to the right showing twelve layers that are created by the Setup script, and a Feedback artboard shown to the left. Each of these will be described below.

The Main Design artboard contains various layers in which the components of the VuMark are created or drawn by the user. The small circle shown in the center of the Main Design artboard represents the origin of the VuMark, which can be moved by the user as will be discussed below.

FIG. 12 illustrates an expanded view of the layers palette with the twelve layers that are created by the Setup script to hold the various parts of a VuMark as they are shown in Adobe Illustrator. Each layer is described in detail below.

The Import layer is a layer that can be used as a "work space" into which to initially paste a VuMark design. Use of this layer is optional, but it can be used to begin separating the various parts of a VuMark design by moving them to the corresponding layers.

The VuMark-ClearSpace layer should contain only one object representing the VuMark's Clear Space. As noted above, the Clear Space should be drawn in Adobe Illustrator as a filled path or a compound path.

The VuMark-Border layer should contain only one object representing the VuMark's Border. As noted above, the Border should be drawn in Adobe Illustrator as a filled path or a compound path.

The VuMark-Contour layer should contain only one object representing the Contour, which is a closed path with 4-20 straight edges. The Contour should be a single path that has exactly as many anchor-points as there are vertices in the Contour. There should not be any overlapping anchors in the Contour path. Once the Border and Clear Space objects have been placed into their corresponding layers, the Pen tool in Illustrator can be used to draw a closed path along the invisible line that is formed where the Border and Clear Space meet. In alternative embodiments, different numbers and kinds of edges, such as arcs or curves, can be used to define the Contour.

The VuMark-Origin layer contains a circle shaped object, the center of which represents a point that will be considered the origin on the VuMark design. Augmentations in augmented reality applications will appear in the application registered to the VuMark relative to the center of this circle. The circle can be moved and resized within the design to match the desired or required origin.

The VuMark-BrightElements layer should only contain the Elements in their Bright state. The number of objects placed in this layer should match the number of required Elements exactly. These Elements should be brighter than the Dark state. As noted above, each Element should be drawn in Adobe Illustrator as a filled path or a compound path.

The VuMark-DarkElements layer should only contain the Elements in their Dark state. The number of objects placed in this layer should match the number of required Elements exactly. These Elements should be darker than the Bright state. As noted above, each Element should be drawn in Adobe Illustrator as a filled path or a compound path.

The VuMark-Background layer contains background design, such as a company or product logo or any other design that the designer wants to include with the VuMark. This layer can be left empty, but it is preferable to use a rich Background layer to support more reliable tracking of the moving location of a VuMark in a captured field of view in a Vuforia application.

The VuMark-Feedback layer is empty at first, but after the Verify script is run, it will be populated with feedback presented on top of the VuMark design to help the user verify that the VuMark meets established design requirements and/or guidelines.

The VuMark-UserData layer can contain graphical elements for various purposes, such as, for example, UI overlays, printing marks, and metadata. The graphic placed in this layer will be exported as part of the VuMark template SVG file and provided with the VuMarkTemplate::getUserData( ) method inside the SDK when the VuMark is loaded. This layer can be left empty.

The VuMark-Description layer contains the details of the VuMark such as the Name, Type, Length and number of required Elements. The Exporter script uses the information contained in this layer, and the layer is locked to prevent accidental deletion or modification by the user.

The VuMark-AsymmetryMarker layer can be used to add Asymmetry Markers that prevent erroneous ID readouts when using a rotationally symmetric Contour, which will be discussed below.

FIG. 13 illustrates an expanded view of an example VuMark Feedback artboard in Adobe Illustrator. The Feedback artboard provides a summary of the "VuMark Properties" based on the Setup script selections. The summary indicates the name of the VuMark, the ID type, the ID length, as well as the required number of elements. The Feedback artboard also shows a checklist titled "Design Guideline Verification" with various design requirements for the VuMark that are checked and verified by the Verify script. The Feedback Artboard also indicates whether all automated verifications have been passed, in which case the design can then be saved or exported as a valid VuMark template data file. If one or more verifications have failed, then an indication is shown that the VuMark template is not ready for export.

At various points during the assembly of the various parts of a VuMark into their respective layers, the Verify script can be executed to provide feedback. The Verify script checks that the various layers of a VuMark conform to established design requirements and then provides feedback in the form of a Pass, Fail, or Verify status message in the Feedback artboard. Before the Verify script is run for the first time on a new VuMark design, the Design Guideline Verification section of the Feedback artboard will show a "Fail" status for each item, except the Border and Clear Space width, which will show "Verify". These status messages can be referred to throughout the design process since they provide a reminder of key design requirements. Each time Verify script is run, the Feedback artboard will update to display the latest verification results, which will show the verification status of the: Number of Elements, Element sizes and locations, Element contrast, Contour segments, Border and Clear Space contrast, and Border and Clear Space width.

With respect to the Number of Elements, the Verify script checks that there is exactly the required number of Elements in each of the BrightElements and DarkElements layers. In one embodiment, this check can be omitted by leaving the amount and/or type of data to be encoded as an open variable based on the number of code elements created by the user.

With respect to the Element sizes and locations, the Verify script checks that each element meets a minimum size requirement, such as 3% of the VuMark's largest dimension, and that the Light and Dark Elements overlap.

With respect to the Element contrast, the Verify script checks that the contrast between the elements BrightElements layer and the DarkElements layer is at least a specified minimum amount, such as 40%.

With respect to the Contour segments, the Verify script checks that the contour has at least the required number of segments, such as between 4 and 20. The script also checks that the segments are of the required shape, such as being linear and not curved, and that the length of each segment is at least a minimum length, such as 3% of the VuMark's largest dimension.

With respect to Border and Clear Space contrast, the Verify script checks that the contrast between the Border layer and the ClearSpace layer is at least a specified minimum amount, such as 40%.

With respect to the Border and Clear Space width check, the Verify script highlights the Contour to provide the user an indication of whether the Border and Clear Space are sufficiently wide. In an alternative embodiment, the Verify script can be configured to automatically check the widths of the Border and Clear Space and provide a pass/fail indication to the user.

Figure 14B:
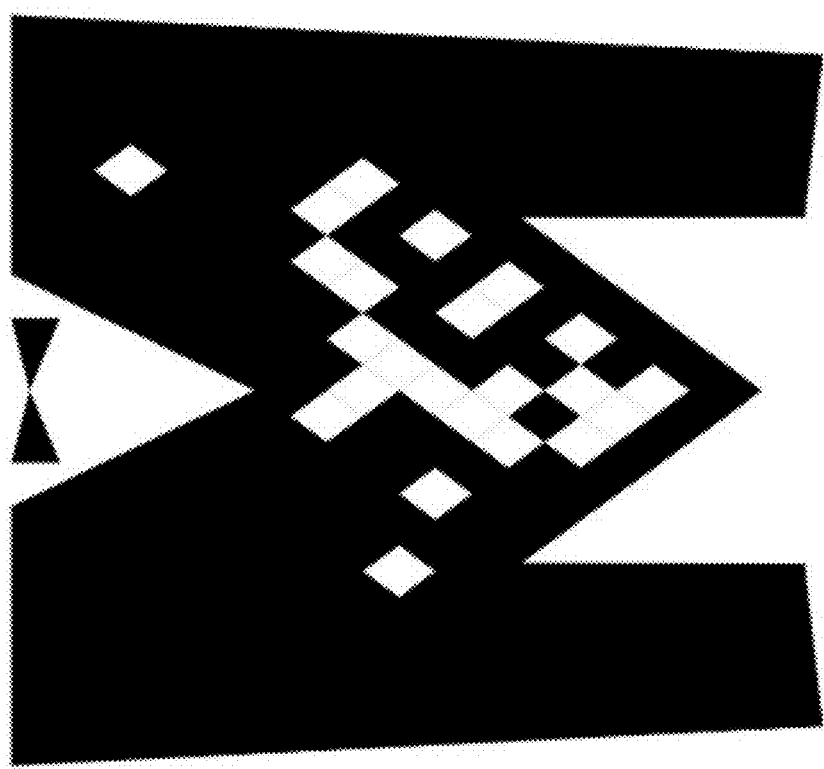
FIG. 14B shows an image instance, based on the completed Morton Tuxedos VuMark template, that has been produced by the Target Manager to encode the String Instance ID "word".
Figure 14A:
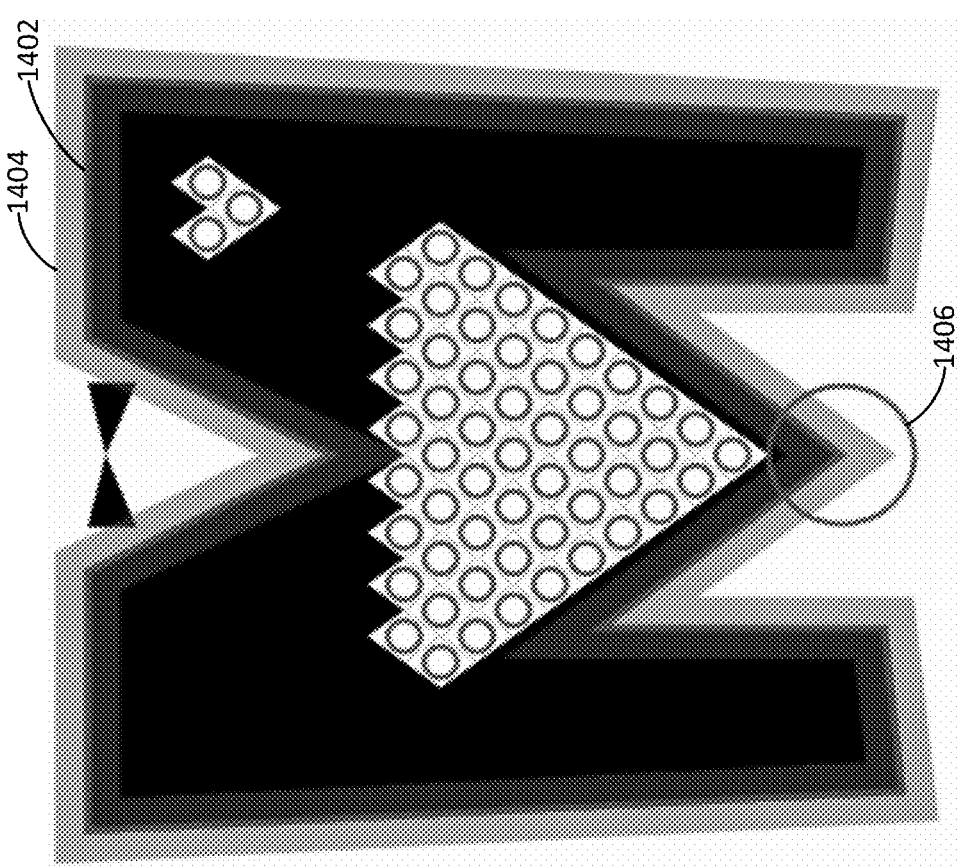
FIG. 14A shows a final design of an example "Morton Tuxedos" VuMark in Illustrator.

FIG. 14A shows a final design of an example "Morton Tuxedos" VuMark in Illustrator. Magenta highlights (shown in dithered black and white) have been applied by the Designer Verify script to indicate verified or verifiable features of the VuMark template. The highlights include a vivid magenta outline 1402 tracing the Contour around the perimeter of the black "M" shaped border shape. The Contour is also traced by a wide partially opaque magenta band overlay 1404 that indicates the required width of the Border and Clear Space on either side of the Contour. The partially opaque magenta band overlay allows the underlying Border and Clear space to be seen through the overlay, which enables the user to verify that the Border and Clear Space are sufficiently wide. The highlights also include a circle within and showing the minimum size of each Element. The highlights also include a larger circle 1406, centered at the bottom center of the "M" indicating the origin of the VuMark.

FIG. 14B shows an image instance, based on the completed Morton Tuxedos VuMark template, that has been produced by the Target Manager to encode the String Instance ID "word". This, and other instances that can be generated based on different Instance IDs, can be printed and applied to objects.

Figure 14C:
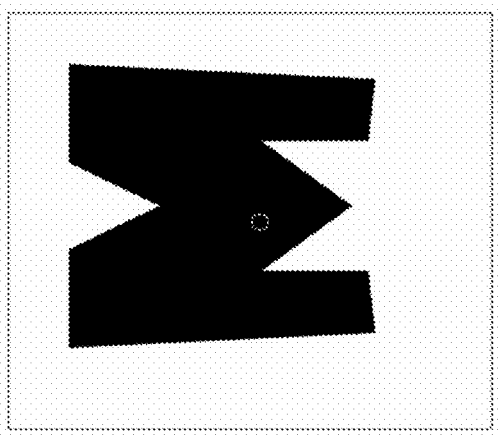
FIG. 14C shows the Main Design artboard of Illustrator after Clear Space and Border layers have been completed in the example.

FIG. 14C shows the Main Design artboard of Illustrator after the Clear Space and Border layers have been completed in the example. The Border object is the black "M", while the ClearSpace object is the white rectangle in which the Border object is enclosed. When the Verify script is run at this stage, the Border and Clear Space contrast check in the Feedback artboard will now show "Pass". As noted above with respect to FIG. 11, the small circle shown in the center of the Main Design artboard represents the origin of the VuMark, which can be moved and resized by the user to the location and size of the origin as shown in FIG. 14A.

Figure 14D:
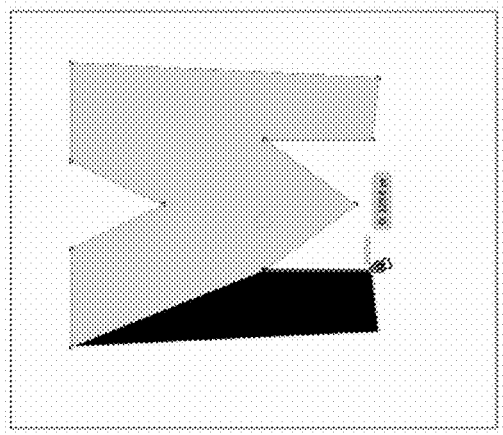
FIG. 14D shows the Pen tool being used to draw a path along the interface between the Border and the Clear Space.

FIG. 14D shows the Pen tool being used to draw a path along the interface between the Border and the Clear Space. In this case, the Border shape has been drawn using anchor points and therefore the pen tool can be used to snap to each of the anchor points of the Border shape while creating the Contour path. In this manner, a highly accurate tracing of the intersection is achieved.

Figure 14E:
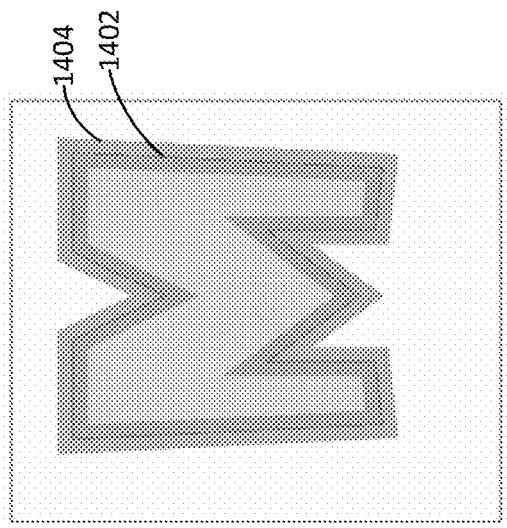
FIG. 14E shows the VuMark within the Main Design artboard after a Verify script has been run on the completed Contour.

FIG. 14E shows the VuMark within the Main Design artboard after the Verify script has been run on the completed Contour. As noted above with respect to FIG. 14A, the Verify script applies a magenta outline 1402 and partially opaque band overlay 1404 to indicate to the user the required width of the Border and Clear Space on either side of the Contour. The Contour is shown filled in a light color, but this will be changed to transparent after the Verify script has been run so that it does not occlude the other design layers. The Contour check of the Feedback artboard will also now show "Pass" indicating that the contour has 12 linear segments and each segment meets the length requirement.

Figure 14F:
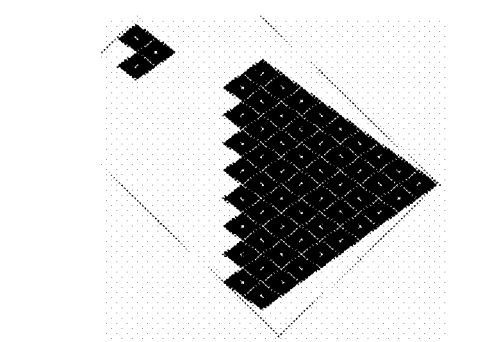
FIG. 14F shows the DarkElements layer within the Main Design artboard after a set of 56 dark Element shapes have been created in the color black.

FIG. 14F shows the DarkElements layer within the Main Design artboard after a set of 56 dark Element shapes have been created in the color black. The Setup script had indicated that 56 elements are required in order to represent string with a length of 4. In this illustration, the remaining layers have been hidden for the sake of clarity.

Figure 14G:
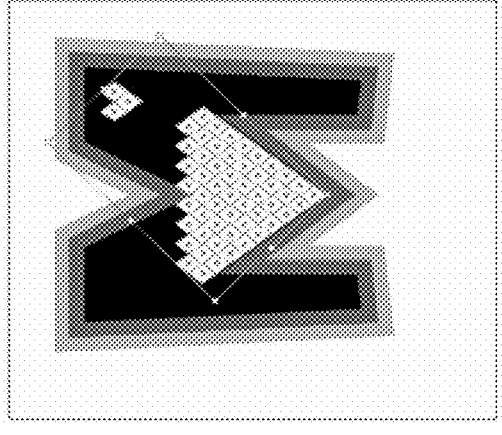
FIG. 14G shows an identical and overlaying set of shapes to the DarkElements layer reproduced in the LightElements layer but in the color white.

FIG. 14G shows an identical and overlaying set of shapes to the DarkElements layer reproduced in the LightElements layer but in the color white. In this illustration the Border and ClearSpace layers have again been unhidden.

Figure 14H:
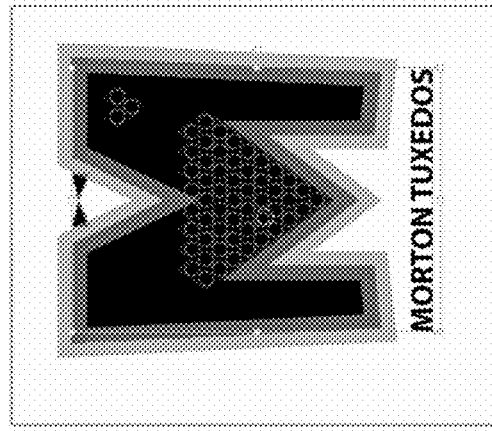
FIG. 14H shows the VuMark after the Verify script has been run with the DarkElements and BrightElements layers populated.

FIG. 14H shows the VuMark after the Verify script has been run with the DarkElements and BrightElements layers populated. The Number of Elements, Element sizes and locations, Element contrast checks will all now indicate "Pass". The Verify script also adds a small circle indicating the minimum size and location to be scanned for each Element. The Background layer has also been competed to include a bowtie shaped object and text reciting "Morton Tuxedos".

At this point in the example design, the Verify script will indicate a "Pass" or "Verify" status for each of the items in the Design Guidelines Verification section. The VuMark design has satisfied all the technical checked requirements of a valid VuMark, and the user should visually verify that the Border and Clear Space widths are at least as wide as the opaque magenta overlay.

With all the checks being passed, the "VuMark Template ready for export" message appears on the Feedback artboard and the Export script can be run. The Export script will again automatically run the Verify script and assuming it again passes all checks, will create a new file in Illustrator, and move the contents from the VuMark template to the new file. The Export script will automatically trim the design artboard so that it matches the size of the VuMark design. The Export script will then prompt the user to save the VuMark template as an SVG file.

The generated VuMark SVG can be then uploaded to the Vuforia target manager and added to a VuMark database. That database in turn, can then be added to a Vuforia app configured to detect instances of the VuMark. In parallel, the Vuforia Target Manger can be used to create image files based on selected Instance IDs to be encoded and those image files can then be printed and/or applied to objects to be scanned with the app.

FIG. 15 illustrates a web page user interface for uploading a VuMark SVG file to a database hosted on a web-based Target Manager. The web page interface provides user input options for selecting the SVG file to upload, a name for the VuMark to be identified by in the target database, and a width for the VuMark for use in augmented reality environments. The width entered should reflect the actual size of the mark as it will be printed on physical objects to be scanned by the Vuforia application, using the same unit scale as used in the augmented reality environment. For example, if the target is to be printed at 30 mm wide and the AR scene uses a millimeter scale, the entered width should be 30.

FIG. 16 illustrates a web page user interface for generating a VuMark instance from the web-based Target Manager. The web page is presented to a user after the user selects the mark from a database and requests to generate an instance of the mark. The web page interface provides user input options for entering an ID, which is the data to be encoded, as well as a choice of graphic format, which in this case provides options of SVG, PDF and PNG.

FIG. 17 illustrates a Contour path drawn around the Border and Clear Space areas in an example VuMark design. In the example, the contour path is a path drawn to enclose the perimeter of the contiguous border image illustrated high-rise buildings in the image. The Clear Space in this example has been filled in the color pink (shown in dithered black and white) to help show its boundaries. The Clear Space area would normally be filled in the color white in this design.

FIG. 18 illustrates examples of how the Verify script visually indicates verification of code Element sizes on the Main Design artboard. In the VuMark-Feedback layer, the Verify script draws magenta circles (shown in dithered black and white in FIG. 19) on top of every Element it finds. The Elements in this design are the windows in the buildings, originally in yellow but shown in the illustration in dithered black and white. The user can inspect the Elements in the design to make sure that they occupy or fill at least the same size and area as the circles. This visualization also helps to identify which Elements might be causing the verification to fail. The verify script verifies that the Elements drawn in the VuMark-BrightElements layer precisely overlap with the elements drawn in the VuMark-BrightElements layer. The verify script also verifies that the code Elements each meet a predetermined minimum size requirement, such as 3% of the maximum dimension (e.g. height or width) of the overall VuMark.

To provide visual feedback to the user, the Verify script creates a circle having a predefined size, based on the width of the overall VuMark design, in each code element it finds. For example, each circle can be configured to have a diameter of the minimum size requirement. The circle can be visualized to the user through the VuMark-Feedback layer. For any code element, if the circle extends beyond the perimeter of the code element, the test will fail.

FIG. 19 illustrates a screenshot of how a detected VuMark having a String type encoding an URL might appear in a Vuforia mobile application. In this illustration, the VuMark application shows an example of a detection highlight graphic displayed over the VuMark. The blue line is a path that was added to the VuMark-UserData layer. Using the UserData layer, an augmentation that is agnostic to the actual VuMark shape can be displayed in an Application.

Vumark Design Considerations

This section discusses VuMark design recommendations that will lead to improved detection performance.

FIGS. 20A and 20B illustrate portions of a non-conforming and a conforming Border and Clear Space configuration respectively, as would be shown after running the Verify script. In the examples of FIGS. 20A and 20B, a magenta overlay 2002 (shown in dithered black and white) is overlaid on each side of the Contour to indicate the minimum width required for the Border and Clear Space. In FIG. 20A, the Border width is too small. Notice how the minimum Border width extends past the actual Border. The Clear Space width is also too small. Notice how the minimum Clear Space width extends past the actual Clear Space. In FIG. 20B, the Border is at least the same width as the minimum Border width indicated by the magenta overlay. The Clear Space is at least the same width as the minimum Clear Space width indicated by the magenta overlay. The user can visually verify that the widths are appropriate using the magenta overlay 2002.

FIGS. 21A and 21B illustrate examples of non-rotationally symmetric and rotationally symmetric contours, respectively. The rotationally symmetric contours illustrated in FIG. 21B have symmetry orders 6, 5, 5 and 4 respectively. When contours are used that are rotational symmetric, there is a minimal, theoretical chance that a Code contained in a certain specific instance may not be read out correctly by the Vuforia app. An Asymmetry Marker can be added to a VuMark design to avoid such read errors.

FIGS. 22A, 22B and 22C illustrate Asymmetry Markers added to rotationally symmetric contours of orders 5, 2 and 4 respectively. Asymmetry Markers are circles that can be manually added to the "VuMark-AsymmetryMarkers" layer, named in order "a0000", "a0001", "a0002", and so on. The circles themselves are not visible in the final VuMark design as printed, but represent locations that are scanned by the Vuforia app in order to orient the VuMark. The Asymmetry Markers establish an arbitrary, rotationally symmetric location in a design with respect to the Contour rotation that fulfills the following criteria. First, the number of Asymmetry Markers should be identical to the symmetry order of the Contour. Second, when rotated around the symmetry center, individual Asymmetry Markers should fall onto each other. The Asymmetry Markers should be on rotationally symmetric locations. Third, one, and only one out of the multiple Asymmetry Markers should have in its center a different color than the other markers. The reason for this is that the one different marker is used to "lock" the orientation to a specific rotation. The contrast between the one and the other markers should be similar to what is used for Dark/Bright elements. The orientation notch 202B shown in FIG. 2, for example, can be used to support the required Asymmetry Markers.

FIG. 23 illustrates various examples of VuMark Contours that would and would not conform to guidelines. The Contour should consist of straight lines that form a closed path. The Contour should have at least 4 sides, and a maximum of 20 sides.

FIG. 24 illustrates a largest dimension of an example VuMark. The length of smallest side of the Contour should be at least 10% of the length of the largest dimension of the overall VuMark. The largest dimension is the larger of either the height or width. The overall size of a VuMark will include all parts of the VuMark, including the Background.

FIG. 25 illustrates examples of VuMark Contours that have conforming and non-conforming angles. The angle between contour segments should be no greater than 150° to ensure a functional design. In the illustrated examples, the bottom example has top and bottom vertices with overly flat angles.

FIG. 26 illustrates examples of conforming and non-conforming VuMark Border and Clear Space areas. The Border and Clear Space share the same design requirements. These requirements guarantee that the Contour establishes a good quality contrast edge. The width of the Border & Clear Space should be at least 5% of the length of the largest dimension of the overall VuMark.

FIG. 27 illustrates additional examples of conforming and non-conforming VuMark Border and Clear Space areas. The Border and Clear Space should be filled with a solid/uniform color. The Border and Clear Space areas should not be transparent or set to "No fill", and should not have a gradient or pattern fill. In Adobe Illustrator, these elements should not use Appearance Attributes. There should be high contrast between the colors of the Border and Clear Space areas. To ensure that there is enough contrast between the colors used for the Border and Clear Space, the colors can be converted to grayscale, and then the "K" value of each color can be inspected. There should be a "K" value difference of at least 30-40%, but more is better. The Clear Space can be placed either inside or outside of the Border, so that the Contour is formed inside or outside of the Border. Note that only the edge of the Border that faces the Clear Space needs to consist of straight lines and meet the length requirements described above. The Border and Clear Space can be effectively interchanged in function, so only the edge of the Clear Space that faces the Border needs to consist of straight lines and meet the length requirements described above. In one embodiment, the Border and Clear Space shapes can each be specified using any graphical image or shape, such as a shape including a pattern, as long there is sufficient contrast between the Border and Clear Space shapes for a Contour to be defined and for automated detection to be performed.

Every Element should have a Bright and Dark state defined. An Element's Bright and Dark state should be represented by different colors that have high contrast to each other. Ideally, all Bright Elements should have the same color, but slight variation is acceptable. The same applies for Dark Elements. When placing the elements brighter elements should go on the "VuMark-BrightElements" layer. The Bright and Dark states of any element should be in the exact same position (perfectly overlapping). An Element's size (both the height and width) should be at least 3% of the length of the largest dimension of the overall VuMark. Each Element can be a unique size and shape provided the element meets the size requirement. Elements should be drawn with filled paths or compound paths. Grouped or layered items should not be used as Elements. Appearance Attributes should not be used for Elements. Elements do not need to be adjacent, and they can be scattered anywhere within the VuMark. Elements can overlap with the Background/Design Area. Elements should not overlap the Border, Clear Space or other Elements. Elements can be placed inside or outside of the Border and Clear Space but the farthest Element should be no more than approximately 50% of the VuMark's width from the border. To ensure that there is enough contrast between the colors used for the Dark and Bright states, there should be a "K" value difference of at least 30-40%, but more is better.

Sometimes it can be challenging to design a VuMark such that it has the exact number of required Elements, but there is a technique to make this easier to accomplish. This technique involves creating more than the required number of Elements, and designating some of them as fake elements. The elements are fake in that they look like real Elements but are actually not included in the Bright or Dark Elements layers—instead they are placed in the Background layer. Since anything in the Background layer is ignored by the Vuforia vision process, the resulting VuMark design technically has the exact number of required elements that the vision process expects. For example, suppose a VuMark requires 122 Elements, but from a design perspective, it is hard to arrange the Elements in an aesthetically pleasing way such that there are exactly 122 elements, but 128 elements fit nicely into the design. Any six elements can be considered or designed to be fake and moved to the Background layer.

Figure 28:
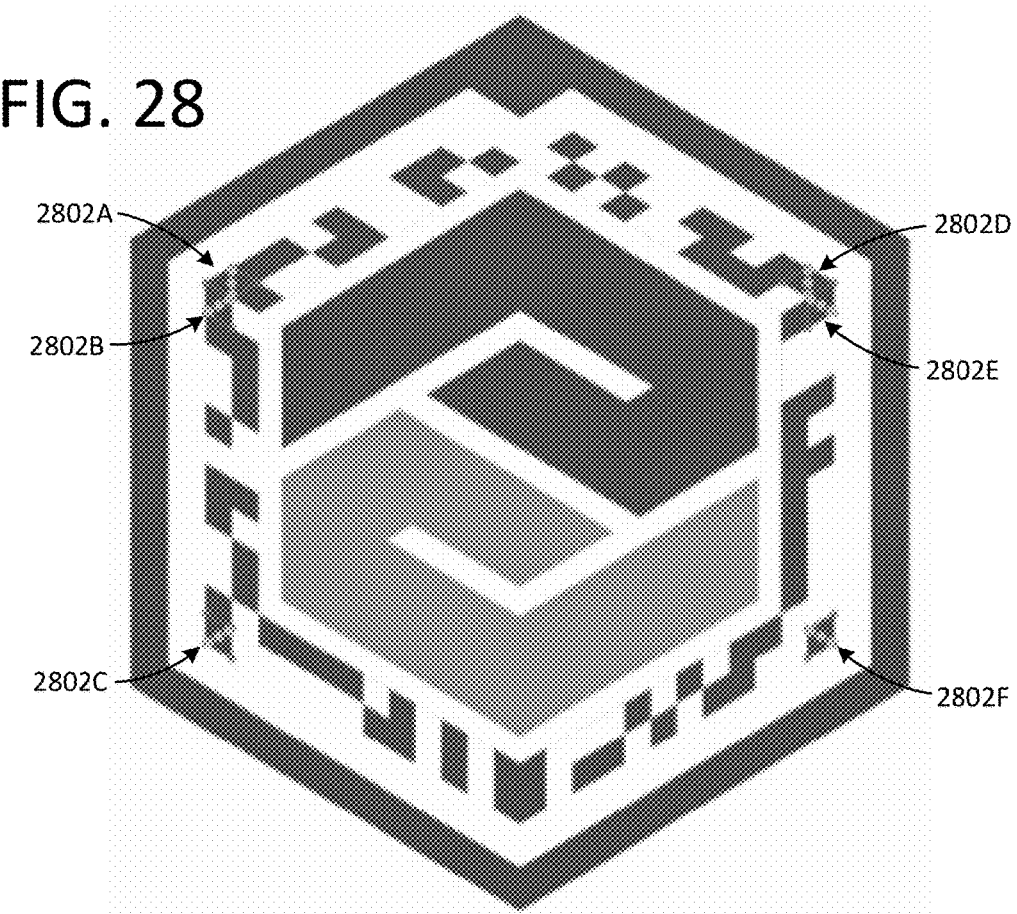
FIG. 28 illustrates a particular VuMark that only required 122 Elements in its design, but the Element layout worked best with 128 Elements including six fake elements.

FIG. 28 illustrates a particular VuMark that only required 122 Elements in its design, but the Element layout worked best with 128 Elements including six fake elements 2802A-F. The six fake elements, which are diamonds highlighted by 5 dots each in the illustration, have been set to look like Dark Elements but have actually been placed in the VuMark-Background layer where they will not be treated as Elements.

Since the Background or Design Area is not used for detection, there are not many requirements or limitations for what can be placed there. There is substantial design freedom to use the background to create a VuMark that expresses a brand or identity. The Background can be empty, and it is assumed to be white. Note that the background can be included in the size of a VuMark, which affects minimal size of Elements, and Border and Clear Space width requirements.

Additional Embodiments and Variations

Various design guidelines, requirements, constraints and recommendations for designing a machine-readable code, target or VuMark that can be detected and/or decoded with high reliability have been discussed herein. Many of the guidelines, requirements, constraints and recommendations discussed herein, however, can be partially or fully violated by a design that can still effectively function, but possibly with a lower level of reliability. Accordingly, there can be some flexibility in, for example, the width of the Border or the Clear Space not conforming to specification, or in having a portion of the background overlap the required width of the Border or Clear Space, with the result being a potentially acceptable minor compromise in detection reliability.

Some of the guidelines, requirements, constraints and recommendations have been indicated as being explicitly checked by a template design application or Verify script. For other requirements, a visual indication or aid of whether the requirement has been met is provided to a user, where the visual indication or aid can be a highlighting or overlay that allows the user to visually verify the requirement. This disclosure specifically contemplates in additional variations on the embodiments described herein, that any of the guidelines, requirements, constraints and recommendations discussed herein can be checked automatically or by providing a visual aid to the user by a template design application and/or script or code operating within a template design application.

In one embodiment, the specification of a data type and/or amount or length of data can be skipped in the design phase of a template. In this case, a template with any desired number of code elements can be created. At instance creation time, the available code elements can be used to encode any type and/or amount of data supported by the available number of code elements. The data type in this case can be encoded along with the data within the available code elements.

In one embodiment, a graphical image, such as a Vuforia Image Target, or any other definition of shapes and colors, can be supplied and used as a detection image in place of the Border and/or Clear Space and Contour in order to support detection and homography determination. The graphical image can be an image supplied, for example, in JPG, PNG, RGB or grayscale formats. A definition of shapes and colors can be supplied, for example, in SVG format. Like Vuforia Image Targets, the graphical image or definition of shapes and colors can be analyzed by a verify script or analysis application in order to determine its suitability for use as a detection image. The analyzed suitability can be provided as feedback to the user, such as on a scale of 1 to 5.

Example Computer

In accordance with the foregoing, any of the template design application, the target manager application, or the detection application and any of the components of the VuMarks commercial embodiment can be configured to be stored on a non-transitory computer-readable medium in order to operate on or in conjunction with a computer. An example computer having various features and components that can be appropriately configured for such use will be described below.

Figure 29:
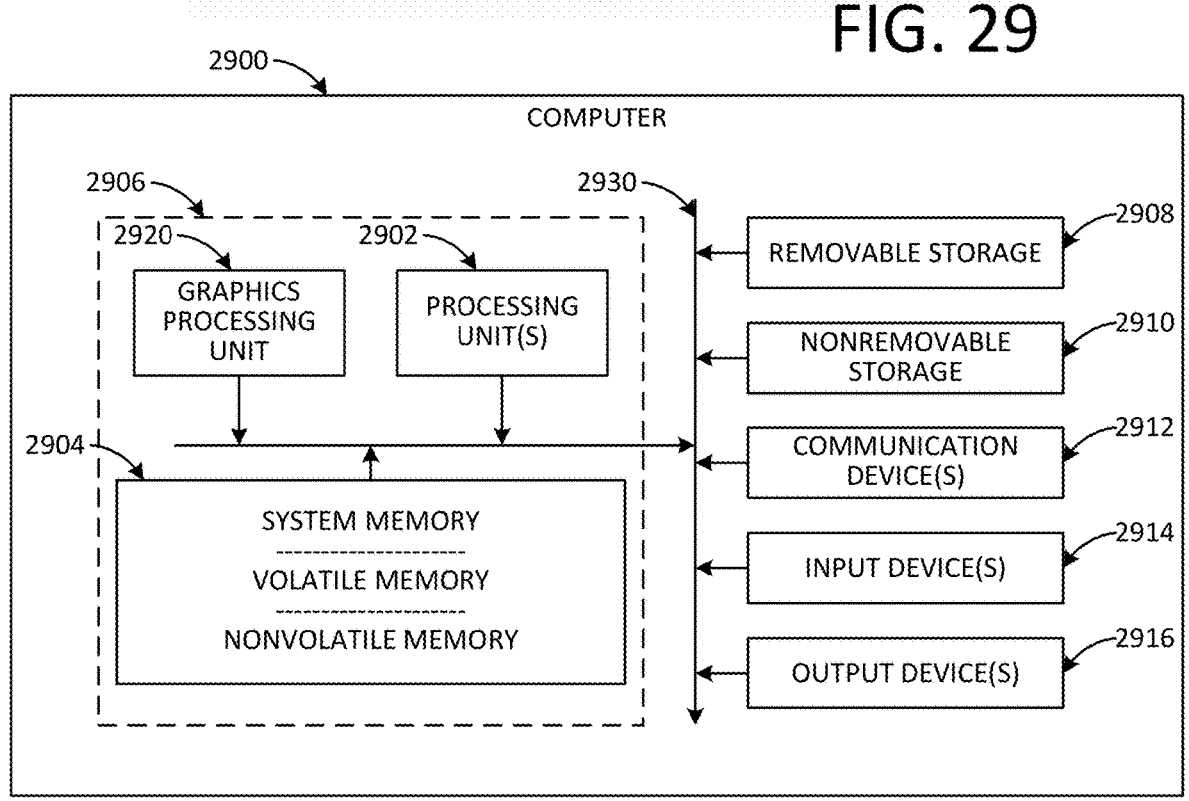
FIG. 29 illustrates an example computer that can be configured for use in accordance with various embodiments.

FIG. 29 illustrates an example computer 2900. Components of the embodiments disclosed herein, which may be referred to as modules, engines, processes, functions or the like, can be implemented by configuring one or more instances of the example computer using special purpose software or applications, possibly in different configurations and optionally networked, as a computer system. The computer 2900 can be any of a variety of general purpose computers such as, for example, a server, a desktop computer, a laptop computer or a mobile computing device.

On a general purpose computer, a processor typically executes computer programs which include an operating system and applications. The operating system is a computer program running on the computer that manages access to various resources of the computer by the applications and the operating system. The various resources generally include memory, storage, communication interfaces, input devices and output devices.

With reference to FIG. 29, the example computer 2900 includes at least one processing unit 2902 and memory 2904. The computer can have multiple processing units 2902 and multiple devices implementing the memory 2904. A processing unit 2902 can include one or more processors or processing cores (not shown) that operate independently of each other. Additional co-processing units, such as graphics processing unit 2920, also can be present in the computer. The memory 2904 may include volatile devices (such as dynamic random access memory (DRAM) or other random access memory device), and non-volatile devices (such as a read-only memory, flash memory, and the like) or some combination of the two. This configuration of memory is illustrated in FIG. 29 by dashed line 2906. The computer 2900 may include additional storage (removable and/or non-removable) including, but not limited to, magnetically-recorded or optically-recorded disks or tape. Such additional storage is illustrated in FIG. 29 by removable storage 2908 and non-removable storage 2910. The various components in FIG. 29 are generally interconnected by an interconnection mechanism, such as one or more buses 2930.

A computer storage medium is any medium in which data can be stored in and retrieved from addressable physical storage locations by the computer. Computer storage media includes volatile and nonvolatile memory devices, and removable and non-removable storage media. Memory 2904 and 2906, removable storage 2908 and non-removable storage 2910 are all examples of computer storage media. Some examples of computer storage media are RAM, ROM, EEPROM, flash memory or other memory technology, CD-ROM, digital versatile disks (DVD) or other optically or magneto-optically recorded storage device, magnetic cassettes, magnetic tape, magnetic disk storage or other magnetic storage devices. Computer storage media and communication media are mutually exclusive categories of media.

The computer 2900 may also include communication device(s) 2912 through which the computer communicates with other devices over a communication medium such as a computer network. Communication media typically transmit computer program instructions, data structures, program modules or other data over a wired or wireless substance by propagating a modulated data signal such as a carrier wave or other transport mechanism over the substance. The term "modulated data signal" means a signal that has one or more of its characteristics set or changed in such a manner as to encode information in the signal, thereby changing the configuration or state of the receiving device of the signal. By way of example, and not limitation, communication media includes wired media such as a wired network or direct-wired connection, and wireless media include any non-wired communication media that allows propagation of signals, such as acoustic, electromagnetic, electrical, optical, infrared, radio frequency and other signals.

Communications device(s) 2912 can include, for example, a network interface or radio transmitter, that interface with the communication media to transmit data over and receive data from signals propagated through communication media. The communication device(s) 2912 can include one or more radio transmitters for telephonic communications over cellular telephone networks, and/or wireless connections to a computer network. For example, a cellular connection, a Wi-Fi connection, a Bluetooth connection, and other connections may be present in the computer. Such connections support communication with other devices, such as to support voice or data communications.

The computer 2900 may have various input device(s) 2914 such as a keyboard, mouse, touchscreen and pen, image input devices, such as still and motion cameras, audio input devices, such as a microphone, and various sensors, such as accelerometers, thermometers and magnetometers. Output device(s) 2916 such as a display, speakers, printers, and so on, also may be included.

The output devices 2916 can include, for example a mobile device display or a monovision or stereoscopic display configured as part of a headset or display glasses or goggles. A stereoscopic display headset can be integrated, for example with a camera and/or an accelerometer as a virtual reality and/or augmented reality headset.

The various storage 2910, communication device(s) 2912, output devices 2916 and input devices 2914 can be integrated within a housing of the computer, or can be connected through various input/output interface devices on the computer, in which case the reference numbers 2910, 2912, 2914 and 2916 can indicate either the interface for connection to a device or the device itself as the case may be.

An operating system of the computer typically includes computer programs, commonly called drivers, that manage access to the various storage 2910, communication device(s) 2912, output devices 2916 and input devices 2914. Such access generally includes managing inputs from and outputs to these devices. In the case of communication device(s), the operating system also may include one or more computer programs for implementing communication protocols used to communicate information between computers and devices through the communication device(s) 2912.

Any of the foregoing aspects may be embodied in one or more instances as a computer system, as a process performed by such a computer system, as any individual component of such a computer system, or as an article of manufacture including computer storage in which computer program instructions are stored and which, when processed by one or more computers, configure the one or more computers to provide such a computer system or any individual component of such a computer system. A server, computer server, a host or a client device can each be embodied as a computer or a computer system. A computer system may be practiced in distributed computing environments where operations are performed by multiple computers that are linked through a communications network. In a distributed computing environment, computer programs may be located in both local and remote computer storage media.

Each component of a computer system such as described herein, and which operates on one or more computers, can be implemented using the one or more processing units of the computer and one or more computer programs processed by the one or more processing units. A computer program includes computer-executable instructions and/or computer-interpreted instructions, such as program modules, which instructions are processed by one or more processing units in the computer. Generally, such instructions define routines, programs, objects, components, data structures, and so on, that, when processed by a processing unit, instruct the processing unit to perform operations on data or configure the processor or computer to implement various components or data structures.

Components of the embodiments disclosed herein, which may be referred to as modules, engines, processes, functions or the like, can be implemented in hardware, such as by using special purpose hardware logic components, by configuring general purpose computing resources using special purpose software, or by a combination of special purpose hardware and configured general purpose computing resources. Illustrative types of hardware logic components that can be used include, for example, Field-programmable Gate Arrays (FPGAs), Program-specific Integrated Circuits (ASICs), Program-specific Standard Products (ASSPs), System-on-a-chip systems (SOCs), and Complex Programmable Logic Devices (CPLDs).

Concluding Comments

Although the subject matter has been described in terms of certain embodiments, other embodiments, including embodiments that may or may not provide various features and advantages set forth herein will be apparent to those of ordinary skill in the art in view of the foregoing disclosure. The specific embodiments described above are disclosed as examples only, and the scope of the patented subject matter is defined by the claims that follow.

The invention claimed is:

1. A system comprising:
a non-transitory computer readable medium encoded with instructions that cause a computer to execute a template design application configured to receive user input specifying a design for a machine-readable target, wherein the user input comprises:
 a specification of a detection contour comprising at least a predetermined minimum number of segments and configured to be recognized by a detection application, and
 a specification of each of a plurality of graphical elements used to encode data based on color, wherein each specification includes a shape, and
wherein the template design application is configured to output a target template data file comprising:
 a definition of the detection contour, and
 a definition of the plurality of graphical elements;
a non-transitory computer readable medium encoded with instructions that cause a computer to execute a target manager application configured to output a target instance image file based on the target template data file and based on data to be encoded; and
a non-transitory computer readable medium encoded with instructions that cause a computer to execute a detection application configured to:
 receive a captured image of a printed target instance produced from the target instance image file,
 apply detection data to the captured image, wherein the detection data is based on the target template data file,
 match a detection contour defined in the detection data to the captured image,
 sample each of the plurality of graphical elements from the captured image, and
 decode the data based on the sampled plurality of graphical elements.

2. The system of claim 1, wherein the detection application is further configured to:
synthesize a tracking target based on the decoded data and the detection data,
receive additional captured images in which the target instance moves from an initial location within a field of view,
use the synthesized tracking target to perform tracking of the target instance moving within the field of view,
determine a homography of the target instance moving within the field of view, and
augment the additional captured images based on the determined homography.

3. The system of claim 1, wherein the detection application is further configured to determine a homography based on the captured image and the detection data.

4. The system of claim 3, wherein the detection application is further configured to provide the homography and the decoded data to an augmented reality application.

5. The system of claim 1, wherein the target manager application is further configured to output the detection data for detecting instances of the machine-readable target.

6. The system of claim 1, wherein the detection contour is a closed path and at least one of the plurality of graphical elements is located outside of the detection contour.

7. The system of claim 1, wherein each segment is selected from the group consisting of: a line, an arc and a curve.

8. The system of claim 1, wherein the detection application is further configured to:
perform an error correction on the decoded data,
determine whether the decoded data is valid based on an algorithmic specification of valid bit codes, and
discard decoded data that has been determined to be invalid.

9. The system of claim 1, wherein the user input further comprises a specification of a placeholder area, wherein the target template data file comprises a definition of the placeholder area, and wherein the target manager application is further configured to insert any of one or more instances of different non-functional designs in the placeholder area to create a target instance image file.

10. The system claim 1,
wherein the user input further comprises a specification of a border shape having a boundary matching the detection contour; and
wherein the design application is further configured to provide an indication to a user of whether:
 the contour is a not closed path,
 the contour does not include at least the predetermined minimum number of segments,
 any of the segments are less than a predetermined minimum relative size,
 the border shape does not maintain at least a predetermined minimum relative width in relation to the contour, and any of the element shapes are less than a predetermined minimum relative size.

11. The system of claim 10, wherein the design application is further configured to determine whether:
the contour is a not closed path,
the contour does not include at least the predetermined minimum number of segments,
any of the segments are less than a predetermined minimum relative size, and
any of the element shapes are less than a predetermined minimum relative size.

12. The system of claim 11, wherein the design application is further configured to determine whether:
the border shape does not maintain at least a predetermined minimum relative width in relation to the contour.

13. The system of claim 11,
wherein the user input further comprises:
a specification of a color for the border shape,
a specification of a color for a clear space area that abuts the border shape along the detection contour, and
a specification of two colors for each of the plurality of graphical elements; and
wherein the design application is further configured to determine whether:
there is at least a predetermined minimum amount of color contrast between the border shape and the clear space area, and
there is at least a predetermined minimum amount of color contrast between the two colors specified for each of the plurality of graphical elements.

14. The system of claim 13,
wherein the user input further comprises a specification of a shape of the clear space area; and
wherein the design application is further configured to provide an indication to a user of whether:
the shape of the clear space area does not maintain at least a predetermined minimum relative width in relation to the contour on an opposite side from the border shape.

15. The system of claim 14, wherein the design application is further configured to determine whether:
the shape of the clear space area does not maintain at least a predetermined minimum relative width in relation to the contour on an opposite side from the border shape.

16. A non-transitory computer readable medium encoded with instructions that cause a computer to execute a template design application, wherein the template design application is configured to:
receive user input specifying a design for a machine-readable target, wherein the user input comprises:
a specification of a border shape, and
a specification of each of a plurality of graphical elements used to encode data based on color, wherein each specification includes a shape;
identify a contour of the border shape as a detection contour configured to be recognized by a detection application;
provide an indication to a user of whether:
the contour is a not closed path,
the contour does not include at least a predetermined minimum number of segments,
any of the segments are less than a predetermined minimum relative size,
the border shape does not maintain at least a predetermined minimum relative width in relation to the contour, and
any of the element shapes are less than a predetermined minimum relative size; and
output a target template data file comprising:
a definition of the detection contour, and
a definition of the plurality of graphical elements.

17. The non-transitory computer readable medium of claim 16, wherein the design application is further configured to determine whether:
the contour is a not closed path,
the contour does not include at least the predetermined minimum number of segments,
any of the segments are less than a predetermined minimum relative size, and
any of the element shapes are less than a predetermined minimum relative size.

18. The non-transitory computer readable medium of claim 17, wherein the design application is further configured to determine whether:
the border shape does not maintain at least a predetermined minimum relative width in relation to the contour.

19. The non-transitory computer readable medium of claim 17,
wherein the user input further comprises:
a specification of a color for the border shape,
a specification of a color for a clear space area that abuts the border shape along the detection contour, and
a specification of two colors for each of the plurality of graphical elements; and
wherein the design application is further configured to determine whether:
there is at least a predetermined minimum amount of color contrast between the border shape and the clear space area, and
there is at least a predetermined minimum amount of color contrast between the two colors specified for each of the plurality of graphical elements.

20. The non-transitory computer readable medium of claim 19,
wherein the user input further comprises a specification of a shape of the clear space area; and
wherein the design application is further configured to provide an indication to a user of whether:
the shape of the clear space area does not maintain at least a predetermined minimum relative width in relation to the contour on an opposite side from the border shape.

21. The non-transitory computer readable medium of claim 20, wherein the design application is further configured to determine whether:
the shape of the clear space area does not maintain at least a predetermined minimum relative width in relation to the contour on an opposite side from the border shape.

* * * * *